US012785779B2

(12) United States Patent
Wang et al.

(10) Patent No.: US 12,785,779 B2
(45) Date of Patent: Nov. 3, 2026

(54) REFERENCE SIGNAL TRANSMISSION FOR BEAM MANAGEMENT IN SIDELINK

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 18/182,816

(22) Filed: Mar. 13, 2023

(65) Prior Publication Data

US 2024/0313844 A1 Sep. 19, 2024

(51) Int. Cl.
*H04B 7/06* (2006.01)
*H04L 5/00* (2006.01)

(52) U.S. Cl.
CPC ......... *H04B 7/0695* (2013.01); *H04L 5/0048* (2013.01)

(58) Field of Classification Search
CPC ...... H04B 7/0408; H04B 7/0695; H04B 7/06; H04B 7/08; H04W 72/50; H04W 72/046; H04W 72/1268; H04W 72/52; H04W 72/21; H04W 16/28; H04W 24/10; H04W 72/0446; H04L 1/1822; H04L 5/0048
See application file for complete search history.

(56) References Cited

U.S. PATENT DOCUMENTS

2022/0046430 A1* 2/2022 Liu ...................... H04B 7/0639
2022/0174655 A1* 6/2022 Tsai ...................... H04W 72/20
2022/0394697 A1* 12/2022 Kim ...................... H04B 7/088
2023/0140393 A1* 5/2023 Guo ................... H04B 7/06966
370/329

OTHER PUBLICATIONS

International Search Report and Written Opinion—PCT/US2024/016222—ISA/EPO—Jul. 15, 2024.
Nokia, et al., "On Beam Management for Sidelink in FR2", 3GPP TSG RAN WG1 #112, R1-2300039, 3rd Generation Partnership Project, Mobile Competence Centre, 650, Route Des Lucioles, F-06921 Sophia-Antipolis Cedex, France, vol. 3GPP RAN 1, No. Athens, Greece, Feb. 27, 2023-Mar. 3, 2023, Feb. 17, 2023, 10 Pages, XP052247193, The whole document.

* cited by examiner

*Primary Examiner* — Iqbal Zaidi
(74) *Attorney, Agent, or Firm* — Holland & Hart LLP

(57) ABSTRACT

Methods, systems, and devices for wireless communication are described. A user equipment (UE) may establish a sidelink communication link for performing one or more sidelink communications with a second UE. The UE may transmit, to the second UE via the sidelink communication link as part of a beam management procedure, a first reference signal using a first beam over a first symbol of a sidelink slot, and a second reference signal using a second beam over a second symbol of the sidelink slot, and may communicate with the second UE using the first beam in accordance with the transmission. The UE may also transmit, over one or more third symbols of the sidelink slot using a third beam at a power level, a gain control signal. The second UE may perform measurements in accordance with the transmission, and may transmit a signal indicating one or more parameters.

24 Claims, 14 Drawing Sheets

REFERENCE SIGNAL TRANSMISSION FOR BEAM MANAGEMENT IN SIDELINK

TECHNICAL FIELD

The following relates to wireless communications, including sidelink reference signal transmission in beam management.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more base stations, each supporting wireless communication for communication devices, which may be known as user equipment (UE).

In some examples, wireless communication devices, such as UEs, may communicate with each other directly using sidelinks. For example, UEs may exchange sidelink communications in sidelink channels and more specifically over symbols of sidelink slots. Sidelink communications may include a physical sidelink shared channel (PSSCH) transmission that carries data, a physical sidelink control channel (PSCCH) transmission that carries sidelink control information (SCI) (including SCI-1 and SCI-2), and automatic gain control (AGC) signaling. Sidelink communications may be transmitted by UEs using one or more beams. For example, a UE may transmit, to a second UE, a PSSCH transmission, a PSCCH transmission, and/or AGC signaling using a wide beam. In some cases, the UE may inefficiently transmit reference signals associated with channel state information (CSI) measurements, such as channel state information reference signals (CSI-RSs), using the same wide beam as that used for PSSCH transmissions, PSCCH transmissions, and/or AGC signaling. Transmitting reference signals using the same wide beam may be inefficient compared to using one or more refined beams because the wide beam may use a higher transmit power compared to transmitting reference signals using a refined beam in a direction of the second UE that may use a lower transmit power. Transmitting CSI-RSs using the same wide beam as PSSCH transmissions, PSCCH transmissions, and/or AGC signaling also results in unnecessary overhead and inefficient resource usage, among other issues, because the CSI-RSs do not require the same overhead as the PSSCH transmissions, PSCCH transmissions, and/or AGC signaling (for example, a quantity of resources and/or symbols to be used for CSI-RSs is less than a quantity of resources and/or symbols to be used for PSSCH transmissions, PSCCH transmissions, and/or AGC signaling). Further, if a UE instead transmits the CSI-RSs or other signals using one or more refined beams to improve efficiency, a spectrum for AGC signaling at a third UE may be saturated, resulting in failed AGC operations. That is, a power threshold for the spectrum may be exceeded due to a transmit power of the one or more refined beams (alone or in combination with a transmit power of the wide beam) being greater at the third UE than a transmit power of the wide beam alone due to the refined beam being in a direction toward the third UE.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes transmitting, to a second UE via a sidelink communication link as part of a beam management procedure, a first reference signal using a first beam over a first symbol of a sidelink slot, and a second reference signal using a second beam over a second symbol of the sidelink slot, and communicating with the second UE using one of the first beam or the second beam in accordance with transmitting the first reference signal and the second reference signal as part of the beam management procedure.

Another innovative aspect of the subject matter described in this disclosure can be implemented in an apparatus for wireless communication. The apparatus includes a processor, memory coupled with the processor and storing instructions executable by the processor to cause the apparatus to transmit, to a second UE via a sidelink communication link as part of a beam management procedure, a first reference signal using a first beam over a first symbol of a sidelink slot, and a second reference signal using a second beam over a second symbol of the sidelink slot, and communicate with the second UE using one of the first beam or the second beam in accordance with transmitting the first reference signal and the second reference signal as part of the beam management procedure.

Another innovative aspect of the subject matter described in this disclosure can be implemented in an apparatus for wireless communication. The apparatus includes means for transmitting, to a second UE via a sidelink communication link as part of a beam management procedure, a first reference signal using a first beam over a first symbol of a sidelink slot, and a second reference signal using a second beam over a second symbol of the sidelink slot, and means for communicating with the second UE using one of the first beam or the second beam in accordance with transmitting the first reference signal and the second reference signal as part of the beam management procedure.

Another innovative aspect of the subject matter described in this disclosure can be implemented in a non-transitory computer-readable medium storing code for wireless communication. The code includes instructions executable by a processor to transmit, to a second UE via a sidelink communication link as part of a beam management procedure, a first reference signal using a first beam over a first symbol of a sidelink slot, and a second reference signal using a second beam over a second symbol of the sidelink slot, and communicate with the second UE using one of the first beam or the second beam in accordance with transmitting the first reference signal and the second reference signal as part of the beam management procedure.

In some examples of the method, apparatuses, and non-transitory computer-readable medium described herein, the beam management procedure is associated with a first set of one or more beams having a first beam width and a second set of one or more beams having a second beam width less than the first beam width, in which the second set of one or more beams includes the first beam and the second beam.

In some examples of the method, apparatuses, and non-transitory computer-readable medium described herein, the beam management procedure is associated with a first set of one or more beams having a first beam width and a second set of one or more beams having a second beam width less than the first beam width, in which the second set of one or more beams includes the first beam, and in which the first set of one or more beams includes the second beam.

Some examples of the method, apparatuses, and non-transitory computer-readable medium described herein may, as part of the beam management procedure, further include operations, features, means, or instructions for receiving, from the second UE via the sidelink communication link in accordance with transmitting the first reference signal and the second reference signal, a signal indicating one or more parameters associated with one or both of the first beam or the second beam, and selecting one of the first beam or the second beam for communicating with the second UE in accordance with the one or more parameters.

Some examples of the method, apparatuses, and non-transitory computer-readable medium described herein may further include operations, features, means, or instructions for transmitting, over one or more third symbols of the sidelink slot using one or more of the first beam or the second beam, a gain control signal for a gain control operation, the gain control operation associated with a first set of one or more beams having a first beam width and a second set of one or more beams having a second beam width less than the first beam width, in which the second set of one or more beams includes one or both of the first beam or the second beam.

One innovative aspect of the subject matter described in this disclosure can be implemented in a method for wireless communication. The method includes receiving, from a first UE via a sidelink communication link as part of a beam management procedure, a first reference signal associated with a first beam over a first symbol of a sidelink slot, and a second reference signal associated with a second beam over a second symbol of the sidelink slot, and communicating with the first UE using one of the first beam or the second beam in accordance with receiving the first reference signal and the second reference signal as part of the beam management procedure.

Another innovative aspect of the subject matter described in this disclosure can be implemented in an apparatus for wireless communication. The apparatus includes a processor, memory coupled with the processor and storing instructions executable by the processor to cause the apparatus to receive, from a first UE via a sidelink communication link as part of a beam management procedure, a first reference signal associated with a first beam over a first symbol of a sidelink slot, and a second reference signal associated with a second beam over a second symbol of the sidelink slot, and communicate with the first UE using one of the first beam or the second beam in accordance with receiving the first reference signal and the second reference signal as part of the beam management procedure.

Another innovative aspect of the subject matter described in this disclosure can be implemented in an apparatus for wireless communication. The apparatus includes means for receiving, from a first UE via a sidelink communication link as part of a beam management procedure, a first reference signal associated with a first beam over a first symbol of a sidelink slot, and a second reference signal associated with a second beam over a second symbol of the sidelink slot, and means for communicating with the first UE using one of the first beam or the second beam in accordance with receiving the first reference signal and the second reference signal as part of the beam management procedure.

Another innovative aspect of the subject matter described in this disclosure can be implemented in a non-transitory computer-readable medium storing code for wireless communication. The code includes instructions executable by a processor to receive, from a first UE via a sidelink communication link as part of a beam management procedure, a first reference signal associated with a first beam over a first symbol of a sidelink slot, and a second reference signal associated with a second beam over a second symbol of the sidelink slot, and communicate with the first UE using one of the first beam or the second beam in accordance with receiving the first reference signal and the second reference signal as part of the beam management procedure.

In some examples of the method, apparatuses, and non-transitory computer-readable medium described herein, the beam management procedure is associated with a first set of one or more beams having a first beam width and a second set of one or more beams having a second beam width less than the first beam width, the second set of one or more beams including the first beam, in which the second set of one or more beams further includes the second beam or the first set of one or more beams includes the second beam.

Some examples of the method, apparatuses, and non-transitory computer-readable medium described herein may, as part of the beam management procedure, further include operations, features, means, or instructions for performing one or more measurements in accordance with receiving the first reference signal associated with the first beam and the second reference signal associated with the second beam to determine one or more parameters associated with one or both of the first reference signal or the second reference signal, and transmitting, to the first UE via the sidelink communication link, a signal indicating the one or more parameters, in which communicating with the first UE using one of the first beam or the second beam is in accordance with transmitting the signal.

DETAILED DESCRIPTION

Figure 1:
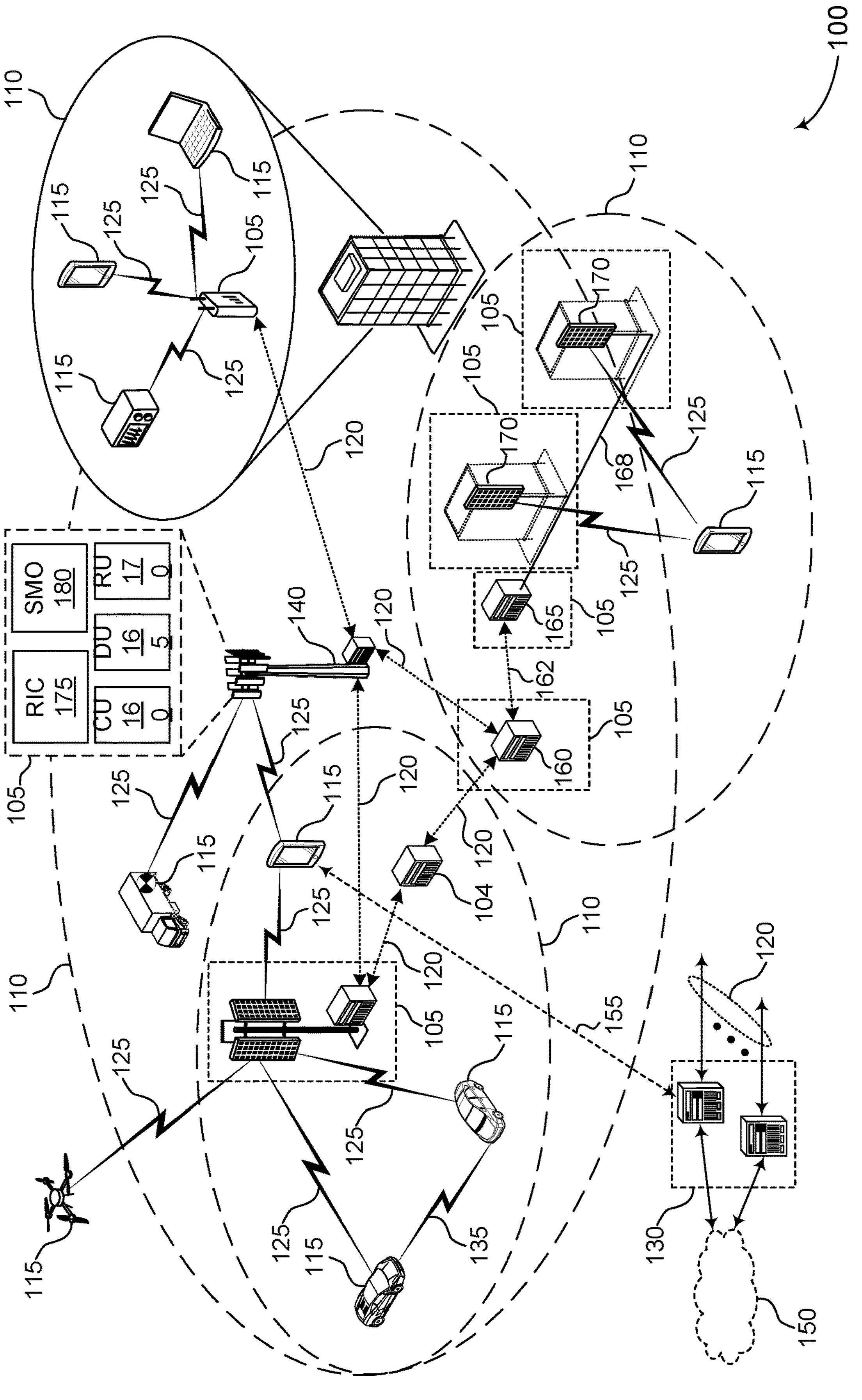
FIG. 1 illustrates an example of a wireless communication system that supports reference signal transmission for beam management in sidelink in accordance with one or more aspects of the present disclosure.

A wireless communication system may support sidelink communication between user equipments (UEs) over one or more sidelink channels. For example, a first UE may transmit, to a second UE, reference signals, automatic gain control (AGC) signals, sidelink data using a physical sidelink shared channel (PSSCH), and/or control information using a physical sidelink control channel (PSCCH). In some examples, the first UE may transmit one or more signals including sidelink data, sidelink control information, and/or AGC signaling within one or more symbols using a wide beam (for example, a beam that may be associated with a synchronization signal block (SSB)). The first UE may support beam management procedures for one or more beams used for sidelink. For example, the first UE may perform initial beam pairing, beam maintenance, and/or beam failure recovery to enable sidelink communication with a second UE based on transmitting and receiving information related to different reference signals (for example, channel state information reference signals (CSI-RSs)). In some examples, the first UE may transmit a CSI-RS using a same wide beam used for transmitting sidelink data, control information, and AGC signaling, and may transmit the CSI-RS in one or more symbols in a same slot as the sidelink data, the control information, or the AGC signaling. However, in examples in which the UE transmits relatively little sidelink data, the UE may still transmit a single CSI-RS in a same slot including the relatively little sidelink data, which may result in wasted resources, unnecessary overhead, and delays in communication. Further, if the UE transmits one or more CSI-RSs or other signals using one or more refined beams (for example, to reduce a transmit power of transmission) a spectrum for AGC signaling at a third UE may be saturated, resulting in failed AGC operations. That is, a power threshold for the spectrum may be exceeded due to a perceived receive power of the refined beams being greater at the third UE than the wide beam due to the refined beam being in a direction of the third UE, in which the third UE may be unable to differentiate between signals due to the threshold being exceeded.

Various aspects generally relate to techniques for implementing reference signal transmission for beam management in sidelink, and more specifically, to performing beam management for sidelink communications by transmitting multiple reference signals (for example, CSI-RSs) with multiple beams in a single sidelink slot. For example, a first UE may transmit, to a second UE over a sidelink as part of a beam management procedure, multiple CSI-RSs using respective refined beams (for example, narrow beams having a width less than a wide beam used for transmitting PSSCH, PSCCH, and/or AGC signaling). In some examples, the first UE may utilize different symbols of the slot to transmit different CSI-RSs. In some examples, the slot may include sidelink data (for example, via PSSCH), control information (for example, via PSCCH), and/or AGC signaling in addition to the different CSI-RSs. The UE may receive a report from the second UE in response to transmitting the different CSI-RSs, may select a beam using parameters in the report, and may communicate with the second UE using the selected beam. In some examples, the UE may transmit the multiple CSI-RSs using a lower power than a transmit power used for an AGC signal transmitted alongside sidelink data and control information using a wide beam. In some examples, the UE may transmit the AGC signal using the wide beam and at a transmit power higher than that used for transmitting the sidelink data and the control information. In some examples, a transmit power of the AGC signal using the wide beam may exceed a maximum sidelink transmit power, in which the UE may use a same refined beam for transmitting the AGC signal, the sidelink data, and the control information such that a transmit power used for transmitting the multiple CSI-RSs is less than the transmit power used for transmitting one or more of the AGC signal, the sidelink data, or the control information.

Particular aspects of the subject matter described herein may be implemented to realize one or more of the following potential advantages. Transmitting different CSI-RSs using respective refined beams over different symbols of a slot that is also used for transmitting sidelink data, control information, and/or AGC signaling may enable UEs to select one or more refined beam to improve a success in communication between the UEs due to a higher perceived receive power at another UE, decrease interference between the UEs due to using the one or more refined beams, and provide power savings for the UEs by avoiding unnecessary retransmissions due to the increased success in communication. Further, the UEs may better utilize resources by transmitting multiple CSI-RSs in the slot through using a subset of the symbols of the slot (for example, one or more of the symbols of the slot) to perform beam management in examples in which a first UE transmits little data within the slot. Additionally, in some examples, by setting a power for CSI-RS transmissions lower than other transmissions (for example, transmitting AGC signaling), a third UE may be more likely to successfully receive and correctly decode the other transmissions, improving a reliability of the other transmissions while also reducing interference and a quantity of retransmissions due to the power for CSI-RS transmissions being lower than a power for the other transmissions. Additionally, or alternatively, transmitting an AGC signal using a wide beam with a transmit power higher than that used for transmitting control information and sidelink data transmissions, and/or transmitting an AGC signal using a same beam as the control information and sidelink data transmissions while lowering a power of CSI-RS transmissions, may improve a reliability of transmitting the AGC signal due to a difference in the transmit power used for the different transmissions.

Aspects of the disclosure are initially described in the context of wireless communication systems. Aspects of the disclosure are further illustrated by and described with reference to wireless communication systems and process flows. Aspects of the disclosure are further illustrated by and described with reference to apparatus diagrams, system diagrams, and flowcharts that relate to reference signal transmission for beam management in sidelink.

FIG. 1 illustrates an example of a wireless communication system 100 that supports reference signal transmission for beam management in sidelink in accordance with one or more aspects of the present disclosure. The wireless communication system 100 may include one or more network entities 105, one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communication with various types of devices, such as other UEs 115 or network entities 105, as shown in FIG. 1.

A node of the wireless communication system 100, which may be referred to as a network node, or a wireless node, may be a network entity 105 (for example, any network entity), a UE 115 (for example, any UE), a network controller, an apparatus, a device, a computing system, one or more components, or another suitable processing entity configured to perform any of the techniques described with reference to FIGS. 1-14. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, among other examples, may include disclosure of the UE 115, network entity 105, apparatus, device, computing system, among other examples, being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (iAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described with reference to FIG. 1.

In the case of the techniques described with reference to FIG. 1 applied in the context of a disaggregated RAN architecture, one or more components of the disaggregated RAN architecture may be configured to support reference signal transmission for beam management in sidelink. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless communication device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which a $\Delta f_{max}$ may represent a supported subcarrier spacing, and $N_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol periods in a TTI) may be variable. Additionally, or alternatively, the smallest scheduling unit of the wireless communication system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may be configured to support ultra-reliable communication or low-latency communications, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (for example, less than 100 kilometers) compared to communication using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a CSI-RS, which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communications. In some other examples, D2D communication may be carried out between the UEs 115 without an involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

In some examples, a UE 115 may communicate one or more reference signals (for example, CSI-RSs) with another UE 115 over a D2D communication link 135. For example, a UE 115 may transmit CSI-RSs alongside one or more signals including sidelink data and control information. Beam management in sidelink may reuse parameters defined in a sidelink CSI framework (for example, for CSI measurement) and in Uu (e.g., between a network entity 105 and a UE 115) beam management procedures. For example, beam management (for example, initial beam-pairing, beam maintenance, and beam failure recovery, and at times including different beamforming procedures) in a licensed spectrum (for example, FR1, FR2) may use unicast, in which a UE 115 may transmit a CSI-RS for beam management in a same unicast transmission using a same wide beam as the sidelink data and the control information (for example, using a single wide beam as defined for Uu beam management or for CSI measurement). A UE 115 may transmit a CSI-RS at the end of a slot used for the sidelink data and the control information using a same wide beam as used for the one or more signals without performing beam sweeping. However, the UE 115 may transmit relatively little sidelink data (and/or control information) in the slot, in which the UE 115 may transmit a single CSI-RS in a same slot including the relatively little sidelink data, which may result in wasted resources, unnecessary overhead, and one or more delays in communications. Further, the UE 115 may transmit one or more CSI-RSs or other signals using refined beams to improve a perceived receive power at another UE 115, which may saturate an AGC broadband at one or more other UEs 115 by exceeding a power threshold at the one or more UEs 115, resulting in failed AGC operations. Thus, methods may be desired for using sidelink CSI-RS for beam sweeping, as well as methods for performing AGC in sidelink.

For example, a UE 115 may perform beam management in sidelink by transmitting multiple reference signals with multiple beams in a single sidelink slot. In some examples, a first UE 115 may transmit, to a second UE 115 over sidelink (for example, via a D2D communication link 135) as part of a beam management procedure, multiple CSI-RSs using respective refined beams in a same sidelink slot (for example, narrow beams having a width less than a wide beam used for sidelink data/control information/AGC). In some examples, the first UE 115 may utilize multiple symbols of a slot to transmit multiple CSI-RSs. In some examples, the slot may include sidelink data, control information, and AGC signaling in addition to the CSI-RSs. In some implementations, the UE 115 may transmit the multiple CSI-RSs using a lower power than a transmit power used for an AGC signal transmitted alongside sidelink data and control information using a wide beam. In some examples, the UE 115 may transmit sidelink data and control information using a refined beam, in which the UE 115 may transmit an AGC signal using the wide beam at a transmit power higher than that of the sidelink data and control information. In some examples, the transmit power of the AGC signal using the wider beam may exceed a maximum sidelink transmit power, in which the UE 115 may use the same refined beam for both AGC signal and sidelink data/control information transmission, in which a power of CSI-RS transmissions may be less than the transmit power of one or more of the AGC signal, the sidelink data, or the control information.

Figure 2:
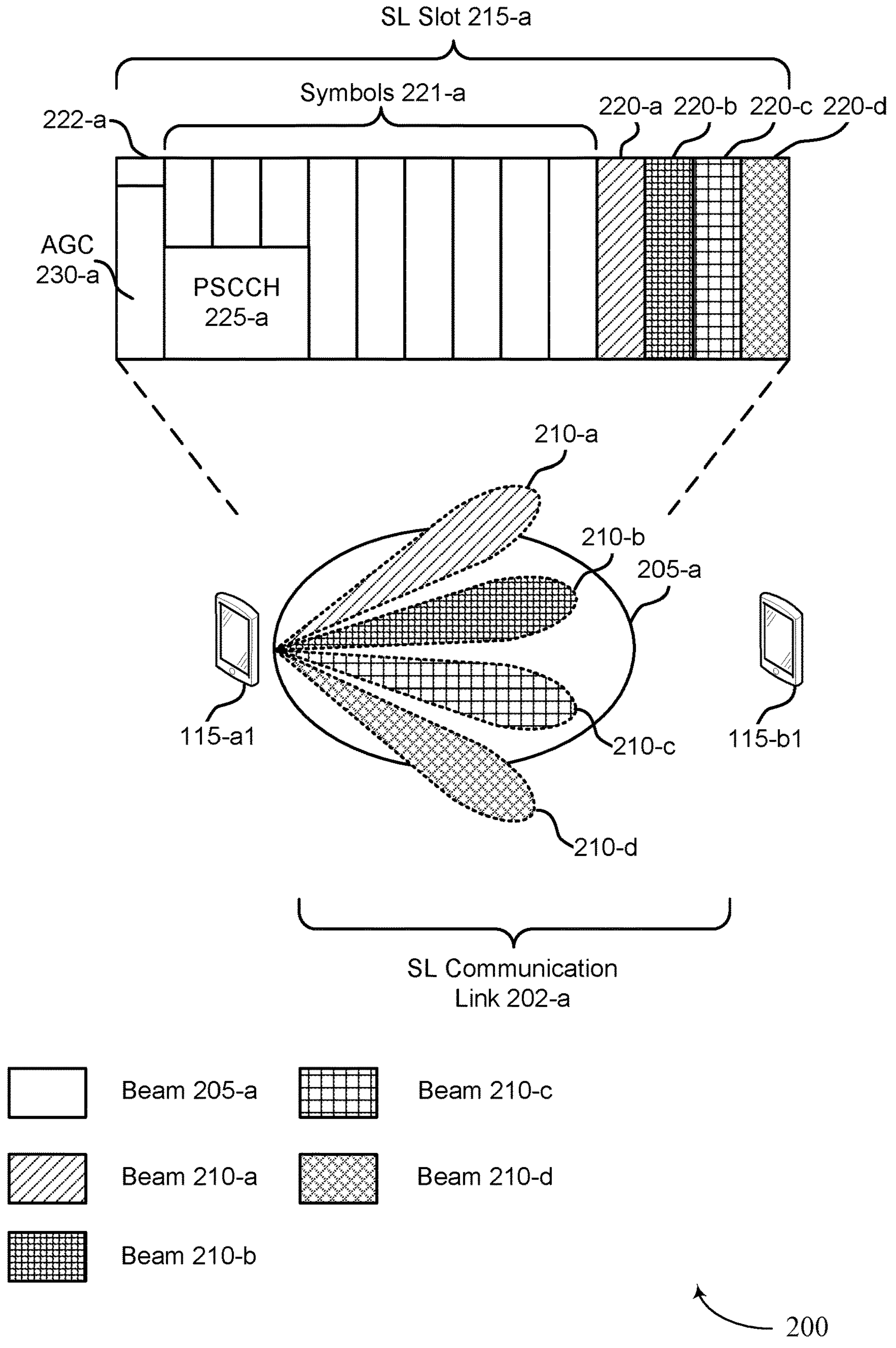
FIG. 2 illustrates an example of a wireless communication system that supports reference signal transmission for beam management in sidelink in accordance with one or more aspects of the present disclosure.

FIG. 2 illustrates an example of a wireless communication system 200 that supports reference signal transmission for beam management in sidelink in accordance with one or more aspects of the present disclosure. The wireless communication system 200 may implement or be implemented by one or more aspects of the wireless communication system 100. For example, the wireless communication system 200 may include a UE 115-*a*1 in communication with a UE 115-*b*1 using an established sidelink communication link 202-*a*, which may represent two UEs 115 and a D2D communication link 135, respectively. In some examples, the UE 115-*a*1 may support transmissions using one or more beams 205 and/or one or more beams 210. The UE 115-*a*1 may transmit one or more signals within a sidelink slot 215 including one or more symbols 220. For example, the UE 115-*a*1 may transmit a PSCCH 225 over one or more symbols 220 of the sidelink slot 215-*a*, in which the PSCCH 225 may include sidelink control information (SCI). The UE 115-*a*1 may additionally transmit a PSSCH over one or more additional symbols 221 of the sidelink slot 215-*a*, the PSSCH including sidelink data (for example, data related to the control information). Additionally, or alternatively, the UE 115-*a*1 may transmit gain control information, for example, within an AGC signal 230 transmitted over another symbol 222 of the sidelink slot 215-*a*.

In some examples, the UE 115-*a*1 may be configured communicate with the UE 115-*b*1 by using a sidelink CSI framework and/or Uu framework a described with reference to FIG. 1. For example, the UE 115-*a*1 may be configured to transmit sidelink CSI-RSs using a same beam as a PSSCH/PSCCH/AGC transmission. For example, the UE 115-*a*1 may transmit the CSI-RS over a symbol 220 (for example, a last symbol) of the sidelink slot 215-*a* using a beam 205. The beam 205 may have a wider beam width (for example, associated with an SSB) compared to a beam 210, where the beams 205 may be referred to as wide beams 205 herein, and the beams 210 may be referred to as refined beams 210 herein. The wide beam 205 may be configured for sidelink data and control information transmissions at the UE 115-*a*1. However, in examples in which the UE 115-*a*1 transmits no sidelink data (and/or control information) or relatively little sidelink data in the sidelink slot 215-*a*, including just the one sidelink CSI-RS transmission over one symbol using the one wide beam 205 may cause excessive overhead for a single slot 215 (for example, where many symbols of the slot 215 may be available due to the no sidelink data or relatively little sidelink data). Such techniques may result in an inefficient use of resources and unnecessary overhead, and may result in inefficient power use and failed transmissions by transmitting a CSI-RS using a same wide beam 205 with a single beam direction as sidelink data and control information transmissions. Additionally, in some examples, the UE 115-*a*1 may configure CSI-RSs for beam management, and may sweep CSI-RS with different beams. However, to perform such beam sweeping, the UE 115-*a* would transmit multiple CSI-RS over multiple slots 215 with a single CSI-RS for each slot 215 before selecting a beam 210, resulting in excessive delays and further inefficient use of resources.

In some examples, to mitigate excessive overhead and improve a reliability and efficiency of communications, the UE 115-*a*1 may support beam management procedures including beam sweeping of reference signals using different beams (with different beam directions) in sidelink communication over multiple symbols of a single slot 215. For example, the UE 115-*a*1 may transmit, as part of a beam management procedure, sidelink CSI-RSs over multiple symbols using respective CSI-RS beams. In some examples, the UE 115-*a*1 may transmit a first CSI-RS over a first symbol 220-*a* of a sidelink slot 215-*a* using a first beam 210-*a* in a first direction. Similarly, the UE 115-*a*1 may transmit a second CSI-RS over a second symbol 220-*b* using a second beam 210-*b*, a third CSI-RS over a third symbol 220-*c* using a third beam 210-*c*, and a fourth CSI-RS over a fourth symbol 220-*d* using a fourth beam 210-*d*. The refined beams 210 may be examples of narrow beams with a beam width smaller than a beam width of a wide beam 210-*a*, which may be a wide beam 205-*a* for sidelink data and control information transmissions. In some examples, the symbols 220 may be CSI-RS symbols, in which the sidelink slot may reserve the symbols 220-*a* through 220-*d* for CSI-RS transmissions.

Additionally, or alternatively, the UE 115-*a*1 may transmit multiple CSI-RSs over multiple symbols 220 using a same beam 210. For example, the UE 115-*a*1 may transmit one or more CSI-RSs over the symbol 220-*a* and the symbol 220-*b* using the refined beam 210-*a* while transmitting one or more CSI-RSs over the symbols 220-*c* and 220-*d* using the refined beam 210-*d*. In some examples, the remaining PSSCH symbols of the sidelink slot 215-*a* may include sidelink data. For example, the UE 115-*a*1 may transmit sidelink data over additional symbols 221-*a* of the sidelink slot 215-*a*. The UE 115-*a*1 may also transmit the PSCCH 225-*a* including control information over three first symbols of the additional symbols 221-*a*. In some examples, the additional symbols 221 may be sidelink data and control information symbols reserved for sidelink data and/or control information. The UE 115-*a*1 may additionally transmit an AGC signal 230-*a* over a first symbol 222-*a* of the sidelink slot 215-*a*, in which the symbol 222-*a* may be an AGC symbol reserved for AGC signal transmissions. In some examples, the UE 115-*a*1 may transmit the sidelink data, the control information of the PSCCH 225-*a*, and the AGC signal 230-*a* in one or more signals.

By transmitting multiple CSI-RSs over one or more symbols 220 of the sidelink slot 215-*a*, the UE 115-*a*1 may refine one or more beams used for sidelink communications. For example, as part of the beam management procedure, the UE 115-*b*1 may receive the CSI-RSs transmitted by the UE 115-*a*1 using the beams 210-*a* through 205-*d*, and may perform one or more measurements to determine CSI of each beam 210. In some examples, the UE 115-*b*1 may determine a layer 1 (L1) reference signal received power (RSRP), a rank indicator (RI), a channel quality indicator (CQI), among other information based on performing measurements on the received CSI-RSs. The UE 115-*b*1 may report the CSI-RS beam sweeping measurement results to the UE 115-*a*1. For example, the UE 115-*b*1 may transmit a sidelink CSI reporting MAC-CE including an RI and a CQI for each received beam 210 corresponding to each CSI-RS. In some examples, the UE 115-*b*1 may extend the format of the sidelink CSI reporting MAC-CE to include the measured L1 RSRP value for each beam 210 corresponding to the CSI-RSs.

Using the reported measurement results, the UE 115-*a*1 may select a refined beam 210. For example, the UE 115-*a*1 may select a beam corresponding to a highest L1 RSRP value or a most reliable (or "best") channel quality using the CQI and RI. In some examples, the UE 115-*b*1 may select a beam and report the beam to the UE 115-*a*1. Additionally, or alternatively, the UE 115-*a*1 may select a beam pair including a refined beam 210 and a corresponding refined beam 210 at the UE 115-*b*1 in accordance with (for example, in response to, using, or after) the measurement report. For example, each of the measurements may correspond to one or more transmit beams and receive beams, in which the UE 115-*a*1, the UE 115-*b*1, or both may select one or more beams for a beam pair for sidelink communications.

In some examples, the UE 115-*a*1 may transmit SCI for measuring CSI of each refined beam 210. For example, the UE 115-*a*1 may transmit SCI within the PSCCH 225-*a* over one or more of the symbols 221-*a*. In some examples, the UE 115-*a*1 may use an extra bit in a first stage SCI message, SCI-1, to indicate that the UE 115-*a*1 is performing CSI-RS beam sweeping. The UE 115-*a*1 may additionally include information related to the beam sweeping in a second stage SCI message, SCI-2. For example, the UE 115-*a*1 may indicate, within the SCI-2, the CSI-RS beams 210-*a* through 210-*d* used for the CSI-RS transmissions, the symbols 220-*a* through 220-*d* over which the CSI-RSs are transmitted, and/or a power offset of the CSI-RS symbols or AGC symbols of the AGC signal 230-*a*. In some examples, the UE 115-*a*1 may include the SCI-2 within the sidelink data of the PSSCH, or may include both the SCI-1 and SCI-2 within a same message in the PSCCH 225-*a*. In some implementations, the information may be in the form of an index to a table for configuring different options of CSI-RS beams, symbols and power offsets. For example, the UE 115-*b*1 may be configured with a table for beam sweeping information before the beam sweeping procedure via RRC. The UE 115-*a*1 may indicate, within the SCI-2, one or more indexes corresponding to one or more of the beams 210-*a* through 210-*d*, the symbols 220-*a* through 220-*d*, and/or the power offsets according to the table.

In some examples, the UE 115-*b*1 may decode the last symbols 220-*a* through 220-*d* of the sidelink slot 215-*a* using the indicated indexes in accordance with the indication in the SCI-1 indicating the beam sweeping procedure. For example, the SCI-1 may indicate to the decode symbols up to the symbol 220-*a* (for example, to determine the information for decoding the symbols 220-*a* through 220-*d*) and to perform measurements using the symbols 220-*a* through 220-*d*. Additionally, or alternatively, the SCI-2 may include explicit indications of the information of the beams 210, the symbols 220, and the power offsets. For example, the SCI-2 may include the information from the table.

In some examples, CSI-RS resource mapping may occupy every resource element of each of the symbols 220-*a* through 220-*d* to improve a measurement result made using the CSI-RSs. For example, the symbols 220-*a* through 220-*d* may not be used for data or control information transmission. In such an example, each resource element of the symbol 220-*a* may be reserved for CSI-RS and/or beam management information, and may include CSI resource mapping information for the corresponding CSI-RS, in which the UE 115-*b*1 may use the mapping information to improve an accuracy of measurement results for reporting CSI. Additionally, or alternatively, the CSI-RS symbols 220-*a* through 220-*d* may be configured in the last symbols of the sidelink slot 215-*a* to minimize an effect on phase continuity of the sidelink data (and/or control information) in the symbols 221-*a* during decoding of the sidelink slot 215-*a*.

In some examples, the UE 115-*a*1 may transmit a CSI-RS for the UE 115-*b*1 to determine channel quality of the beam 210-*a*. For example, the UE 115-*a*1 may transmit a CSI-RS over the wide beam 205-*a* for use in channel quality measurements at the UE 115-*b*1. The UE 115-*a*1 may also transmit CSI-RSs over both the wide beam 205-*a* and the refined beams 210-*a* through 210-*d* for use in beam sweeping procedures. Additionally, or alternatively, the UE 115-*a*1 may use the wide beam 205-*a* for initial pairing, for example, to establish the sidelink communication link 202-*a*, and the UE 115-*a*1 and the UE 115-*b*1 may use the symbols 220-*a* through 220-*d* and the refined beams 210-*a* through 210-*d* for beam management (for example, selecting a beam for communication).

Figure 3:
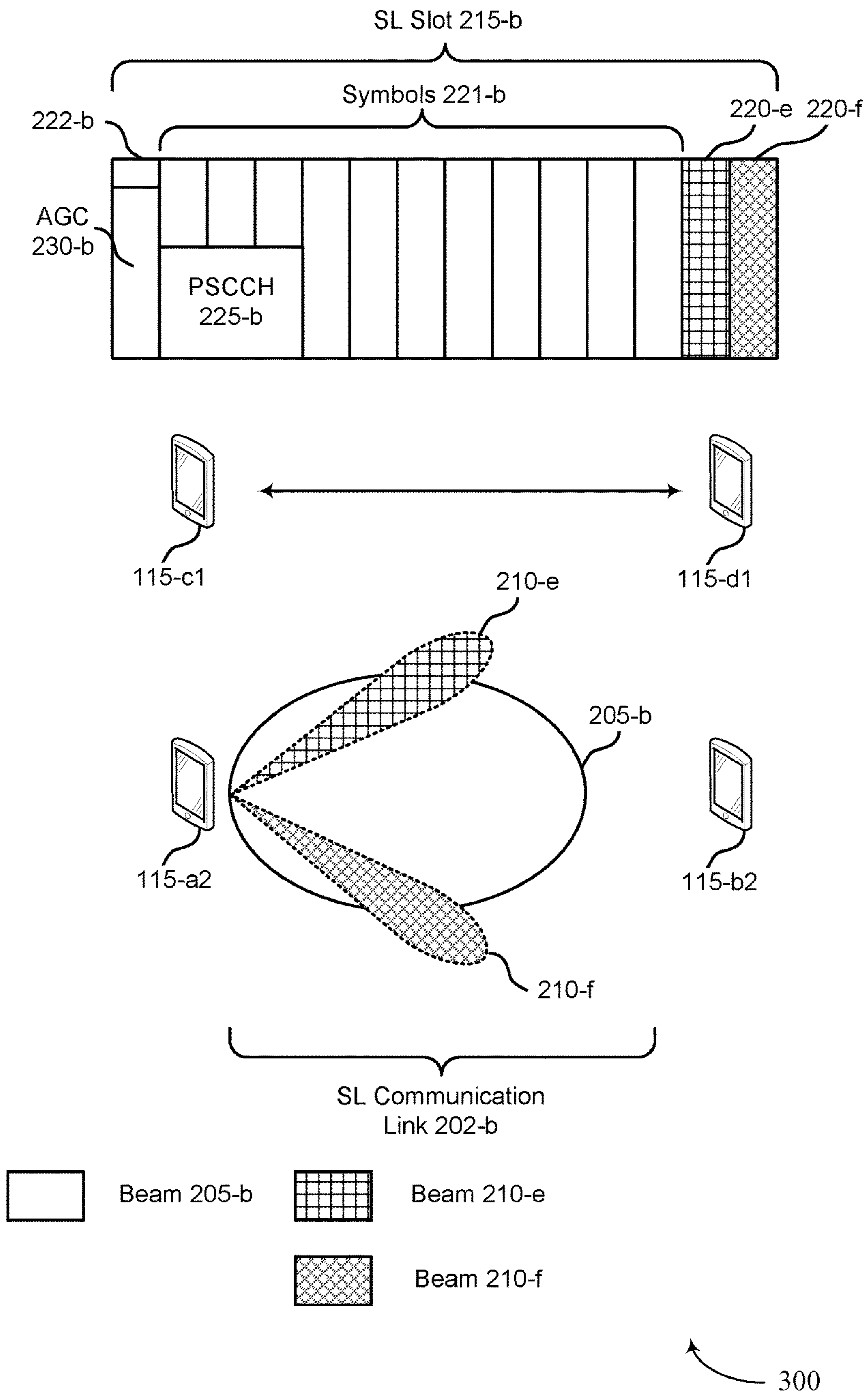
FIG. 3 illustrates an example of a wireless communication system that supports reference signal transmission for beam management in sidelink in accordance with one or more aspects of the present disclosure.

FIG. 3 illustrates an example of a wireless communication system 300 that supports reference signal transmission for beam management in sidelink in accordance with one or more aspects of the present disclosure. The wireless communication system 300 may implement or be implemented by one or more aspects of the wireless communication system 100 and/or the wireless communication system 200. For example, the wireless communication system 300 may include a UE 115-*a*2 in communication with a UE 115-*b*2 using an established sidelink communication link 202-*b*, which may represent the UE 115-*a*1, the UE 115-*b*1, and the sidelink communication link 202-*a*, respectively, described with reference to FIG. 2. In some examples, the UE 115-*a*2 may initialize communication (for example, establish the sidelink communication link 202-*b*) using a wide beam 205-*b*, and may support beam management operations including transmitting one or more CSI-RSs using refined beams 210-*e* and 210-*f* as described with reference to FIG. 2. For example, the UE 115-*a*2 may transmit, as part of a beam management procedure, a first CSI-RS over a first symbol 220-*e* of a sidelink slot 215-*b* using the beam 210-*e*, and may transmit a second CSI-RS over a second symbol 220-*f* of the sidelink slot 215-*b* using the beam 210-*f*, and may receive a measurement report from the UE 115-*b*2 in accordance with the CSI-RS transmissions. The UE 115-*a*2 may additionally use the wide beam 205-*b* to perform a PSSCH transmission of sidelink data and a PSCCH 225-*b* transmission of control information over one or more additional symbols 221-*b*. The UE 115-*a*2 may also transmit an AGC signal 230-*b* using the wide beam 205-*b* in a first symbol 222-*b* of the sidelink slot 215-*b*. There may also be one or more additional UEs 115 within a network including the UEs 115-*a*2 and 115-*b*2 (for example, in a same cell or neighboring cell). For example, a UE 115-*c*1 and a UE 115-*d*1 may be in communication with each other using an additional sidelink communication link 202 and may exchange one or more communications.

In some examples, any of the UEs 115 may perform AGC operations to stabilize a gain (for example, a signal amplitude) of one or more transmissions or receptions despite variation in an original signal. For example, the UE 115-*b*2 and/or the UE 115-*d*1 may receive the AGC signal 230-*b* transmitted by the UE 115-*a*2 using the wide beam 205-*b*. However, in examples of using multiple symbols for sidelink CSI-RS beam sweeping as described with reference to FIG. 2, a transmission beam change within the sidelink slot 215-*b* may affect a receive power of one or more transmissions at one or more of the UEs 115. For example, the UE 115-*d*1 may receive one or more transmissions from the UE 115-*a*2 and/or the UE II5-*b*2 that are not intended for the UE 115-*d*1, such as a CSI-RS transmitted using the beam 210-*e* in a direction toward the UE 115-*d*1. Due to the narrow beam width of the refined beam 210-*e* in a direction aligned with the UE 115-*d*1, a receive power of the CSI-RS unintended for the UE 115-*d*1 may be higher than that of the AGC signal 230-*b*. As the UE 115-*d*1 may be tuned for low power AGC signals 230 (for example, for wide beam 205-*b* directed slightly away from the UE 115-*d*1), the increased power (for example, increased perceived receive power at the UE 115-*d*1) of the CSI-RS may saturate a receiver of the UE 115-*d*1 (for example, may exceed a power threshold at the UE 115-*d*1) and cause interference, resulting in failed reception of or inaccurate decoding of the AGC signal 230-*b*. This may result in delays in AGC operations and increased latency in communications.

In some examples, to mitigate interference from CSI-RS transmissions using refined beams 210 and to enable successful AGC signal reception, the UE 115-*a*1 may support power adjustment of CSI-RS transmissions relative to AGC transmissions. For example, the UE 115-*a*2 may set a transmit power for CSI-RSs using refined beams 210 to be X dB less than a transmit power of AGC signaling (and/or of PSCCH and PSSCH transmissions over additional symbols 221 using the wide beam 205-*b*) to compensate for the higher received power from using a refined beam. For example, while the UE 115-*c*1 is in communication with the UE 115-*d*1, the UE 115-*a*2 may communicate with the UE 115-*b*2 using the refined beams 210-*e* and 210-*f* (for example, CSI-RS beams) for CSI-RS transmissions. The UE 115-*d*1 (and/or the UE 115-*b*2) may perform AGC based on the AGC signal 230-*b* transmitted over the first symbol 222-*b* using the wide beam 205-*b* (for example, an AGC beam). At the end of the slot 215-*b*, the UE 115-*d*1 may receive a CSI-RS transmitted using the refined beam 210-*e* (and/or the beam 210-*f*). However, due to the reduced power of the CSI-RS transmission being less than the transmit power of the AGC signal 230-*b*, the UE 115-*d* may mitigate interference and successfully receive and perform an AGC operations using the AGC signal 230-*b*.

In some examples, the UE 115-*a*2 may receive an indication of the transmit power adjustment of the CSI-RS. For example, the UE 115-*a*2 may receive RRC signaling indicating a power adjustment for CSI-RS transmissions. In some examples, the RRC signaling may indicate a relative value of X dB in relation to other symbols, in which the UE 115-*a*2 may set the CSI-RS transmit power to X dB less than the transmit power of other symbol transmissions (for example, of the sidelink data, control information, and/or AGC transmissions). Additionally, or alternatively, the RRC signaling may indicate an explicit value of a CSI-RS transmit power and/or transmit power for other symbol transmissions. In some examples, the UE 115 may receive relative or explicit indications via additional signaling, such as DCI or dynamic signaling.

Figure 4:
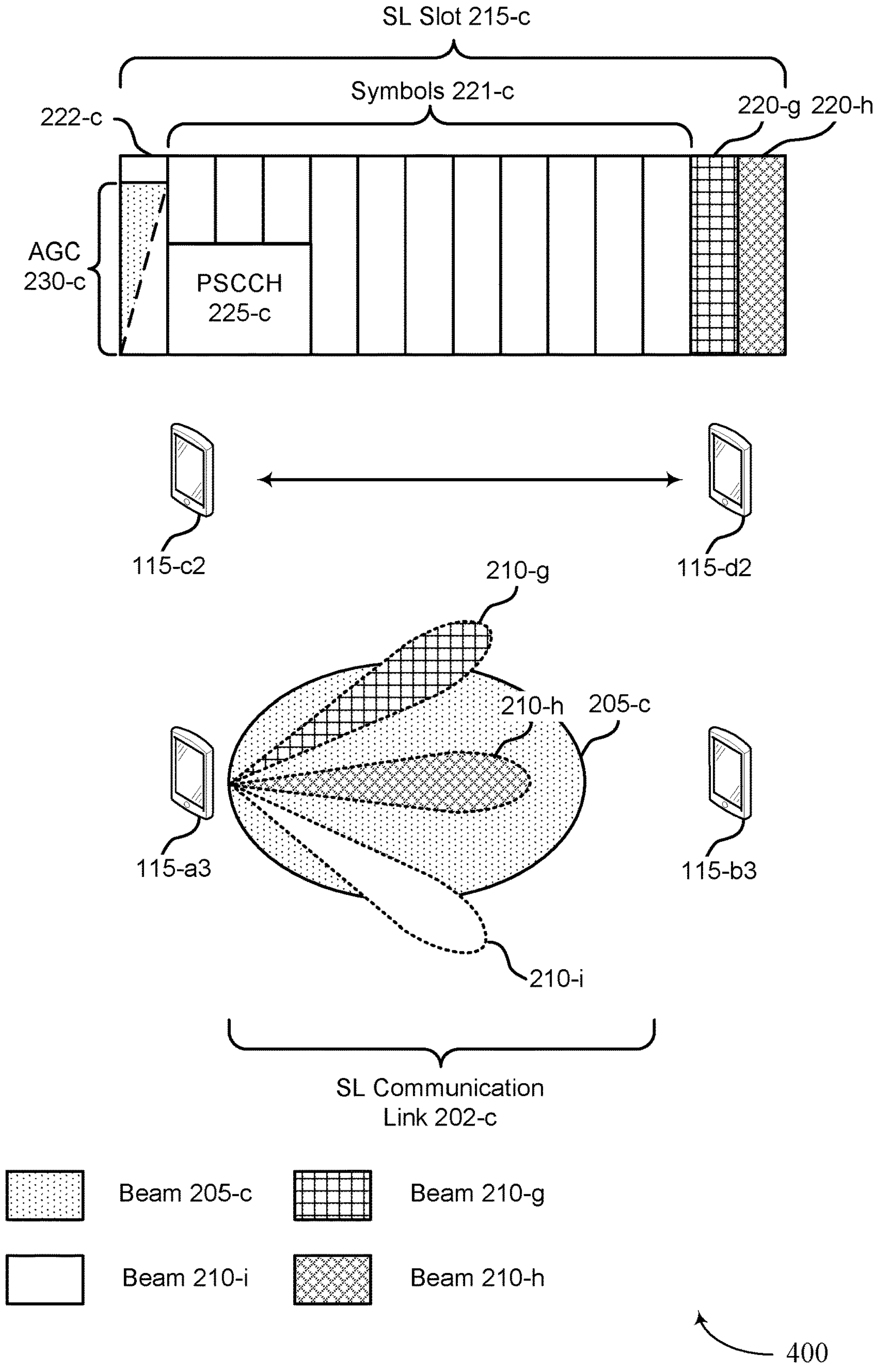
FIG. 4 illustrates an example of a wireless communication system that supports reference signal transmission for beam management in sidelink in accordance with one or more aspects of the present disclosure.

FIG. 4 illustrates an example of a wireless communication system 400 that supports reference signal transmission for beam management in sidelink in accordance with one or more aspects of the present disclosure. The wireless communication system 400 may implement or be implemented by one or more aspects of the wireless communication system 100, the wireless communication system 200, and/or the wireless communication system 300. For example, the wireless communication system 400 may include a UE 115-*a*3 in communication with a UE 115-*b*3 using an established sidelink communication link 202-*c*, which may represent the UE 115-*a*2, the UE 115-*b*2, and the sidelink communication link 202-*b*, respectively, described with reference to FIG. 3. In some examples, the UE 115-*a*3 may support beam management operations including transmitting one or more CSI-RSs using refined beams 210-*g* and 210-*h* for beam refinement as described with reference to FIGS. 2 and 3. For example, the UE 115-*a*3 may transmit a first CSI-RS over a first symbol 220-*g* of a sidelink slot 215-*c* using the refined beam 210-*g*, and may transmit a second CSI-RS over a second symbol 220-*h* of the sidelink slot 215-*c* using the beam 210-*h*, and may receive a measurement report from the UE 115-*b*3 in accordance with the CSI-RS transmissions. The wireless communication system 400 may also include a UE 115-*c*2 in communication with a UE 115-*d*2, which may represent the UE 115-*c*1 and the UE 115-*d*1 described with reference to FIG. 3.

In some examples, the UE 115-*b*3 may initialize communication and transmit sidelink data, control information, and AGC symbols using a refined beam 210 instead of a wide beam 205. For example, the UE 115-*a*3 may use a refined beam 210-*i* to perform a PSSCH transmission of sidelink data and a PSCCH-c transmission of control information over one or more additional symbols 221-*c* of the sidelink slot 215-*c*. The UE 115-*a*3 may also transmit an AGC signal 230-*c* using the same refined beam 210-*i* in a first symbol 222-*c* of the sidelink slot 215-*c*. In some examples, the UE 115-*b*3 may use the CSI-RSs to measure candidate beams 210-*g* and 210-*h* for beam refinement procedures and/or to determine CSI. In some examples, due to a direction of the refined beam 210-*i* used to transmit the AGC signal 230-*c*, the UE 115-*d*2 may have difficulty successfully receiving the AGC signaling. For example, as depicted in FIG. 4, the UE 115-*b*3 may transmit the AGC signal 230-*c* using the refined beam 210-*i* in a direction away from the UE 115-*d*2. This may result in a lower power of AGC signal 230-*c* transmitted over an AGC symbol and received at the UE 115-*d*2. Further, the UE 115-*d*2 may receive CSI-RSs at a higher power than the AGC signal 230-*c*, as the UE 115-*a*3 may transmit the CSI-RSs using the refined beams 210-*g* and 210-*h* in directions more closely directed toward the UE 115-*d*2, resulting in interference and saturation of AGC broadband.

Similar to the procedures described in FIG. 3, the UEs 115 may implement different power adjustments of CSI-RS and AGC signaling using wide beams 205 and refined beams 210 to enable successful AGC reception at the UE 115-*d*2. For example, the UE 115-*a*3 may transmit the AGC signal 230-*c* using a wide beam 205-*c* instead of the refined beam 210-*i*. In some examples, the UE 115-*a*3 may set a transmit power of the AGC signal 230-*c* transmitted using the wide beam 205-*c* to be greater than a transmit power of the data/control information transmission on the beam 210-*i*. For example, the UE 115-*a*3 may set the transmit power of the AGC signal 230-*c* to be Y dB above a transmit power of the sidelink data/control information using the refined beam 210-*i*. Additionally, or alternatively, the UE 115-*a*3 may set a transmit power of the AGC signal 230-*c* to be Y dB above a transmit power of the CSI-RSs transmitted using the beams 210-*g* and 210-*h* (for example, CSI-RSs transmitted at same power as sidelink data/control information). In some examples, a network entity or other device may signal the transmit power of the AGC symbols explicitly or with a relative value (for example, in RRC or other signaling) as described with respect to FIG. 3. The UE 115-*d*2 may have an increased likelihood of receiving and correctly decoding the AGC signal 230-*c* due to the higher transmit power of the AGC signal 230-*c*. Similar to the example describe in FIG. 3, setting the AGC transmit power to be higher may decrease interference and result in successful reception of AGC signaling at the UE 115-*d*2. For example, by increasing a transmit power of AGC, the UE 115-*d*2 may compensate for a higher AGC signal, resulting in an AGC broadband mitigating an increased power of CSI-RS transmissions.

In some examples, before the transmitting the AGC signal 230-*c* using the wide beam 205 or another beam (for example, before the sidelink slot 215-*c*), the UE 115-*a*3 may determine whether the increased transmit power of the AGC symbol using the wider beam exceeds a maximum sidelink transmit power. In examples in which the UE 115-*a*3 determines that the transmit power is less than or equal to the maximum sidelink transmit power, the UE 115-*a*3 may proceed to transmit the AGC signal 230-*c* using the wide beam 205-*c* during the slot 215-*c*. However, in examples in which the UE 115-*a*3 determines that the increased transmit power of the AGC signal 230-*c* exceeds the maximum sidelink transmit power, the UE 115-*a*3 may instead transmit the AGC signal 230-*c* using the same refined beam 210-*i* as the data and control information transmission. The UE 115-*a*3 may additionally set the power of the CSI-RS transmissions using the refined beams 210 to be less than the transmit power of the sidelink data, the control information, and the AGC symbols. For example, the UE 115-*a*3 may set the transmit power of the CSI-RSs using the refined beams 210-*g* and 210-*h* to be Z dB less than a transmit power of the AGC signal 230-*c* over the symbol 222-*c*. The UE 115-*a*3 may successfully receive the AGC signal 230-*c* and set an AGC due to the transmit power of the AGC being larger than that of the CSI-RSs.

In some examples, instead of transmitting the AGC signal 230-*c* using the refined beam 210-*i*, the UE 115-*a*3 may increase a threshold or maximum sidelink transmit power. For example, the UE 115-*a*3 may increase the maximum sidelink transmit power to allow for an increased AGC transmit power without oversaturating an AGC broadband at the UE 115-*d*2 in examples in which there is room in the AGC broadband for increasing the threshold. However, in examples in which the AGC broadband is saturated due to the reception of CSI-RS signaling, the UE 115-*a*3 may refrain from increasing the threshold or maximum sidelink transmit power and may instead transmit the AGC signal 230-*c* using the refined beam 210-*i*.

In either example of transmitting the AGC signal 230-*c* using the wide beam 205-*c* or the refined beam 210-*i*, from an unintended receiver perspective, such as at the UE 115-*d*2, the receive power of the AGC signal 230-*c* from the UE 115-*a*3 may be the same as the receive power of the AGC signal 230-*c* could have been in examples in which the UE 115-*a*3 had transmitted the AGC on a beam directed toward UE 115-*b*3 (for example, using the beam 210-*h*). In some examples, the UE 115-*a*3 may instead transmit the AGC and data/control information signaling using a beam further directed toward the UE 115-*d*2. For example, the UE 115-*a*3 may transmit the AGC signal 230-*c* (and the PSSCH/PSCCH 225-*c*) using the refined beam 210-*g* (or beam 210-*h*) in a direction toward the UE 115-*d*2 while transmitting CSI-RSs using the refined beams 210-*h* and/or 210-*i*.

Figure 5:
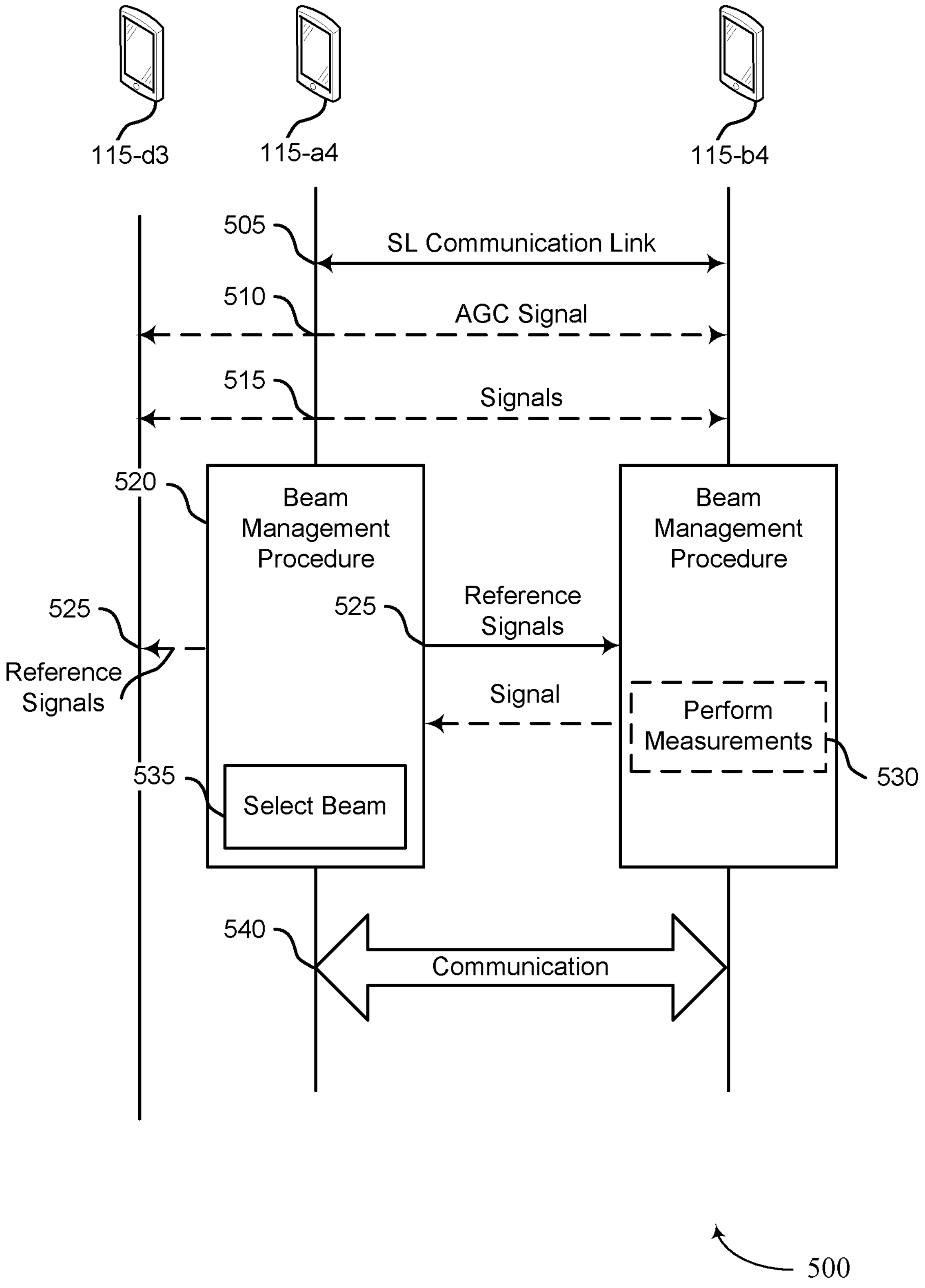
FIG. 5 illustrates an example of a process flow that supports reference signal transmission for beam management in sidelink in accordance with one or more aspects of the present disclosure.

FIG. 5 illustrates an example of a process flow 500 that supports reference signal transmission for beam management in sidelink in accordance with one or more aspects of the present disclosure. The process flow 500 may implement or be implemented by one or more aspects of one or more of the wireless communication systems 100, 200, 300, and 400. For example, the process flow 500 may include a first UE 115-*a*4 in communication with a second UE 115-*b*4 and a third UE 115-*d*3, which may represent a UE 115-*a*, a UE 115-*b*, and a UE 115-*d*, respectively, described with reference to FIGS. 2-4. In some examples, the first UE 115-*a*4, the second UE 115-*b*4, and the third UE 115-*d*3 may support various beam management and AGC operations as described with respect to FIGS. 2-4.

Alternative examples of the following may be implemented, in which some processes are performed in a different order than described or are not performed. In some cases, processes may include additional features not mentioned below, or further processes may be added.

At 505, the first UE 115-*a*4 may establish a sidelink communication link for performing one or more sidelink communications with the second UE 115-*b*4 (for example, a second UE). For example, the first UE 115-*a*4 may establish a sidelink communication link 202 which may represent a D2D communication link 135. In some examples, the first UE 115-*a*4 may initialize beam management operations, performed at 520 by transmitting reference signals over a first and second symbol of a sidelink slot using a first and second beam, by establishing the sidelink communication link with the second UE 115-*b*4 with signaling using a wide beam (for example, a wide beam 205 associated with an SSB).

At 510 and 515, the first UE 115-*a*4 may optionally transmit a gain control signal and one or more signals. For example, the first UE 115-*a*4 may transmit, over one or more third symbols of the sidelink slot using one or more of the first beam or the second beam, a gain control signal (for example, an AGC signal 230) for a gain control operation. The gain control operation may be associated with a first set of one or more beams having a first beam width (for example, wide beams 205) and a second set of one or more beams having a second beam width less than the first beam width (for example, refined beams 210), in which the second set of one or more beams may include one or both of the first beam or the second beam. For example, the first UE 115-*a*4 may transmit an AGC signal 230 in a first symbol 222 of a slot 215 using a wide beam 205 or a refined beam 210 as described with reference to FIGS. 3 and 4. In some examples, one or both of the second UE 115-*b*4 and the third UE 115-*d*3 may receive the AGC signal 230 and perform an AGC operation to set one or more gain values using the AGC signal 230. Additionally, or alternatively, the first UE 115-*a*4 may transmit one or more signals to one or both of the second UE 115-*b*4 and the third UE 115-*d*3 using a third beam (for example, a wide beam 205) over one or more third symbols of the sidelink slot.

In some examples, the one or more signals may indicate one or more of a beam management procedure, a beam, a symbol, or a power offset for communicating with the second UE 115-*b*4 using one of the first beam or the second beam as described with reference to FIG. 2. For example, the one or more signals may include a PSCCH and a PSSCH, and may include a first control message (SCI-1) and a second control message (SCI-2) within one or more of the PSCCH or the PSSCH. In some examples, at least a bit in the first control message may indicate the beam management procedure. Additionally, or alternatively, one or more bits in the second control message may indicate one or more of the first beam, the second beam, the third beam, the first symbol, the second symbol, or the one or more third symbols. In some examples, the one or more bits may indicate or one or more power offsets corresponding to one or more of the first reference signal, the second reference signal, or a gain control signal. The one or more bits may additionally indicate additional beams, symbols, power offsets, among other information for communications between the first UE 115-*a*4 and the second UE 115-*b*4 using one of the first beam or the second beam.

The gain control signal may be transmitted using a third beam of the first set of one or more beams and transmitted at a first power level higher than a second power level at which one or both of the first reference signal or the second reference signal are transmitted. For example, the AGC signal 230 may be transmitted using a wide beam 205 and CSI-RSs may be transmitted using refined beams 210 and at a transmit power X db lower than a transmit power of the AGC signal 230 as described with reference to FIG. 3. At 515, the first UE 115-*a*4 may also transmit, to the second UE 115-*b*4 and/or the third UE 115-*d*3, the one or more signals using the third beam over one or more fourth symbols of the sidelink slot. For example, the first UE 115-*a*4 may transmit sidelink data and control information over additional symbols 221 using a same wide beam 205 as the AGC signal 230 as described with reference to FIG. 3.

By way of another example, the gain control signal may be transmitted using the third beam of the first set of one or more beams and transmitted at a third power level higher than a fourth power level at which the first UE 115-*a*4 transmits one or more signals using a fourth beam of the second set of one or more beams. For example, the first UE 115-*a*4 may transmit an AGC signal 230 using a wide beam 205 and at a transmit power Y db higher than a transmit power of a sidelink data transmission and/or control information transmission sent using a refined beam 210 as described with reference to FIG. 4. Additionally, or alternatively, the gain control signal may be transmitted using a fifth beam of the second set of one or more beams having the second beam width less than the first beam width and transmitted at a fifth power level higher than a sixth power level at which one or both of the first reference signal or the second reference signal are transmitted. The gain control signal may be transmitted using the fourth beam in accordance with a third power level associated with transmitting the gain control signal using the third beam of the first set of one or more beams satisfying a power level threshold. For example, the first UE 115-*a*4 may determine that the increased transmit power of the AGC signal 230 exceeds a maximum sidelink transmit power, and may transmit the AGC signal 230 within a same refined beam 210 as the sidelink data and/or control information transmissions while lowering CSI-RS transmit power to Z db less than a transmit power of the AGC signal 230 as described with reference to FIG. 4.

At 520, the first UE 115-*a*4 and the second UE 115-*b*4 may perform a beam management procedure associated with the first set of one or more beams having the first beam width and the second set of one or more beams having the second beam width less than the first beam width, in which the first set of one or more beams includes the first beam. The second set of one or more beams may further include the second beam. For example, the first UE 115-*a*4 may perform beam management by transmitting CSI-RSs using two refined beams 210. Additionally, or alternatively, the first set of one or more beams may include the second beam. For example, the first UE 115-*a*4 may transmit one CSI-RS using a refined beam 210, while transmitting another CSI-RS using a wide beam 205 (for example, for channel measurement purposes).

At 525, as part of the beam management procedure, the first UE 115-*a*4 may transmit, to the second UE via the sidelink communication link, a first reference signal using the first beam over the first symbol of a sidelink slot and a second reference signal using the second beam over the second symbol of the sidelink slot. For example, the first UE 115-*a*4 may transmit a first CSI-RS using a first refined beam 210 over a first symbol 220 and a second CSI-RS using a second refined beam 210 over a second symbol 220 of a sidelink slot 215 as described with reference to FIGS. 2-4. In some examples, the first symbol and the second symbol may be the last-in-time two symbols of the sidelink slot. Additionally, or alternatively, one or more first resources of the first reference signal may occupy each resource element of the first symbol. One or more second resources of the second reference signal may additionally occupy each resource element of the second symbol. In some examples, the UE 115-*a*4 may transmit reference signals to the UE 115-*d*3 as well.

At 530, as part of the beam management procedure, the second UE 115-*b*4 may perform one or more measurements in accordance with receiving the first reference signal associated with the first beam and the second reference signal associated with the second beam to determine one or more parameters associated with one or both of the first reference signal or the second reference signal. For example, the one or more parameters may include one or more RIs, one or more CQIs, one or more RSRPs, or any combination thereof. The second UE 115-*b*4 may transmit at 530, to the first UE 115-*a*4 via the sidelink communication link in accordance with the first reference signal and the second reference signal, a signal indicating one or more parameters associated with one or both of the first beam or the second beam. For example, the first UE 115-*a*4 may receive a measurement report from the second UE 115-*b*4. In some examples, the first UE 115-*a*4 may receive a MAC-CE indicating one or more parameters associated with one or both of the first beam or the second beam, in which the one or more parameters may include one or more RIs, one or more CQIs, one or more RSRPs, or any combination thereof. For example, the first UE 115-*a*4 may receive a MAC-CE indicating RIs, CQIs, and L1 RSRPs determined by the second UE 115-*b*4 measuring CSI-RSs corresponding to each beam as described with reference to FIG. 2.

At 535, as part of the beam management procedure, the first UE 115-*a*4 may select one of the first beam or the second beam for communicating with the second UE 115-*b*4 in accordance with the one or more parameters. For example, the first UE 115-*a*4 may select a refined beam 210 associated with a highest L1 RSRP or best channel quality using the CQI and RI as described with reference to FIG. 2.

At 540, the first UE 115-*a*4 and the second UE 115-*b*4 may communicate using one of the first beam or the second beam in accordance with transmitting the first reference signal and the second reference signal. For example, the first UE 115-*a*4 and the second UE 115-*b*4 may communicate using a refined beam selected at 535 in accordance with performing the beam management procedure using the MAC-CE indicating the one or more parameters.

Figure 6:
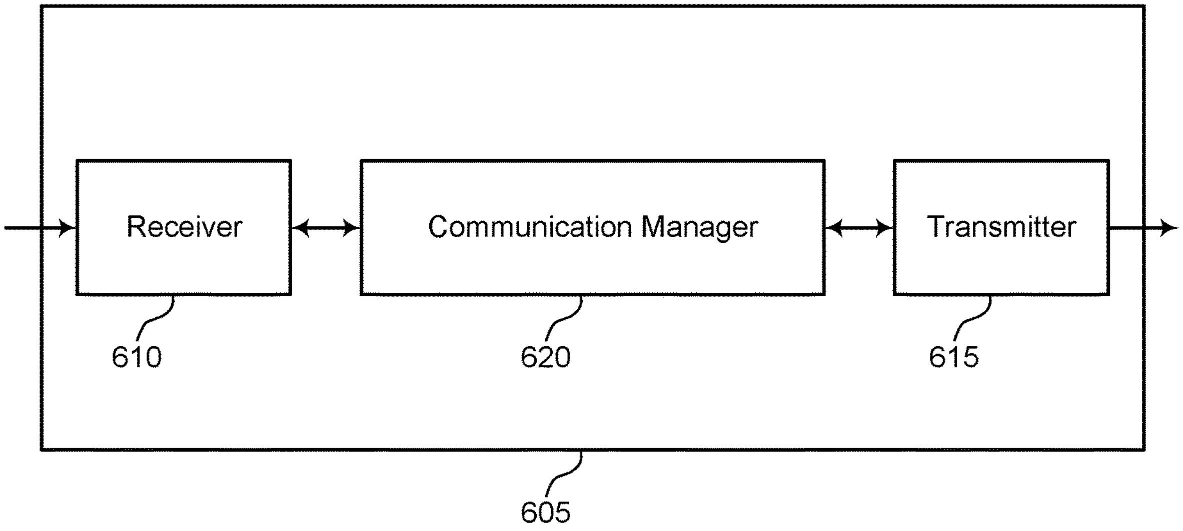
FIGS. 6 and 7 illustrate block diagrams of devices that support reference signal transmission for beam management in sidelink in accordance with one or more aspects of the present disclosure.

FIG. 6 illustrates a block diagram of a device 605 that supports reference signal transmission for beam management in sidelink in accordance with one or more aspects of the present disclosure. The device 605 may be an example of aspects of a UE 115. The device 605 may include a receiver 610, a transmitter 615, and a communication manager 620. The communication manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to reference signal transmission for beam management in sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to reference signal transmission for beam management in sidelink). In some examples, the transmitter 615 may be co-located with a receiver 610 in a transceiver component. The transmitter 615 may utilize a single antenna or a set of multiple antennas.

The communication manager 620, the receiver 610, the transmitter 615, or various combinations thereof or various components thereof may be examples of means for performing various aspects of reference signal transmission for beam management in sidelink. For example, the communication manager 620, the receiver 610, the transmitter 615, or various combinations or components thereof may support a method for performing one or more of the functions described with reference to FIGS. 1-14.

Additionally, or alternatively, in some examples, the communication manager 620, the receiver 610, the transmitter 615, or various combinations or components thereof may be implemented in code (for example, as communication management software or firmware) executed by a processor. If implemented in code executed by a processor, the functions of the communication manager 620, the receiver 610, the transmitter 615, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communication manager 620 may be configured to perform various operations (for example, receiving, obtaining, monitoring, outputting, transmitting) using or otherwise in cooperation with the receiver 610, the transmitter 615, or both. For example, the communication manager 620 may receive information from the receiver 610, send information to the transmitter 615, or be integrated in combination with the receiver 610, the transmitter 615, or both to obtain information, output information, or perform various other operations.

The communication manager 620 may support wireless communication at a first UE in accordance with examples as disclosed herein. For example, the communication manager 620 may be configured as or otherwise support a means for establishing a sidelink communication link for performing one or more sidelink communication with a second UE. The communication manager 620 may be configured as or otherwise support a means for transmitting, to the second UE via the sidelink communication link as part of a beam management procedure, a first reference signal using a first beam over a first symbol of a sidelink slot, and a second reference signal using a second beam over a second symbol of the sidelink slot. The communication manager 620 may be configured as or otherwise support a means for communicating with the second UE using one of the first beam or the second beam in accordance with transmitting the first reference signal and the second reference signal as part of the beam management procedure.

Additionally, or alternatively, the communication manager 620 may support wireless communication at a second UE in accordance with examples as disclosed herein. For example, the communication manager 620 may be configured as or otherwise support a means for establishing a sidelink communication link for performing one or more sidelink communication with a first UE. The communication manager 620 may be configured as or otherwise support a means for receiving, from the first UE via the sidelink communication link as part of a beam management procedure, a first reference signal associated with a first beam over a first symbol of a sidelink slot, and a second reference signal associated with a second beam over a second symbol of the sidelink slot. The communication manager 620 may be configured as or otherwise support a means for communicating with the first UE using one of the first beam or the second beam in accordance with receiving the first reference signal and the second reference signal as part of the beam management procedure.

By including or configuring the communication manager 620 in accordance with examples, the device 605 (for example, a processor controlling or otherwise coupled with the receiver 610, the transmitter 615, the communication manager 620, or a combination thereof) may support techniques for reduced power consumption and more efficient utilization of communication resources by performing beam refinement and adjusting a transmit power of CSI-RSs, AGC signals, and one or more signals.

Figure 7:
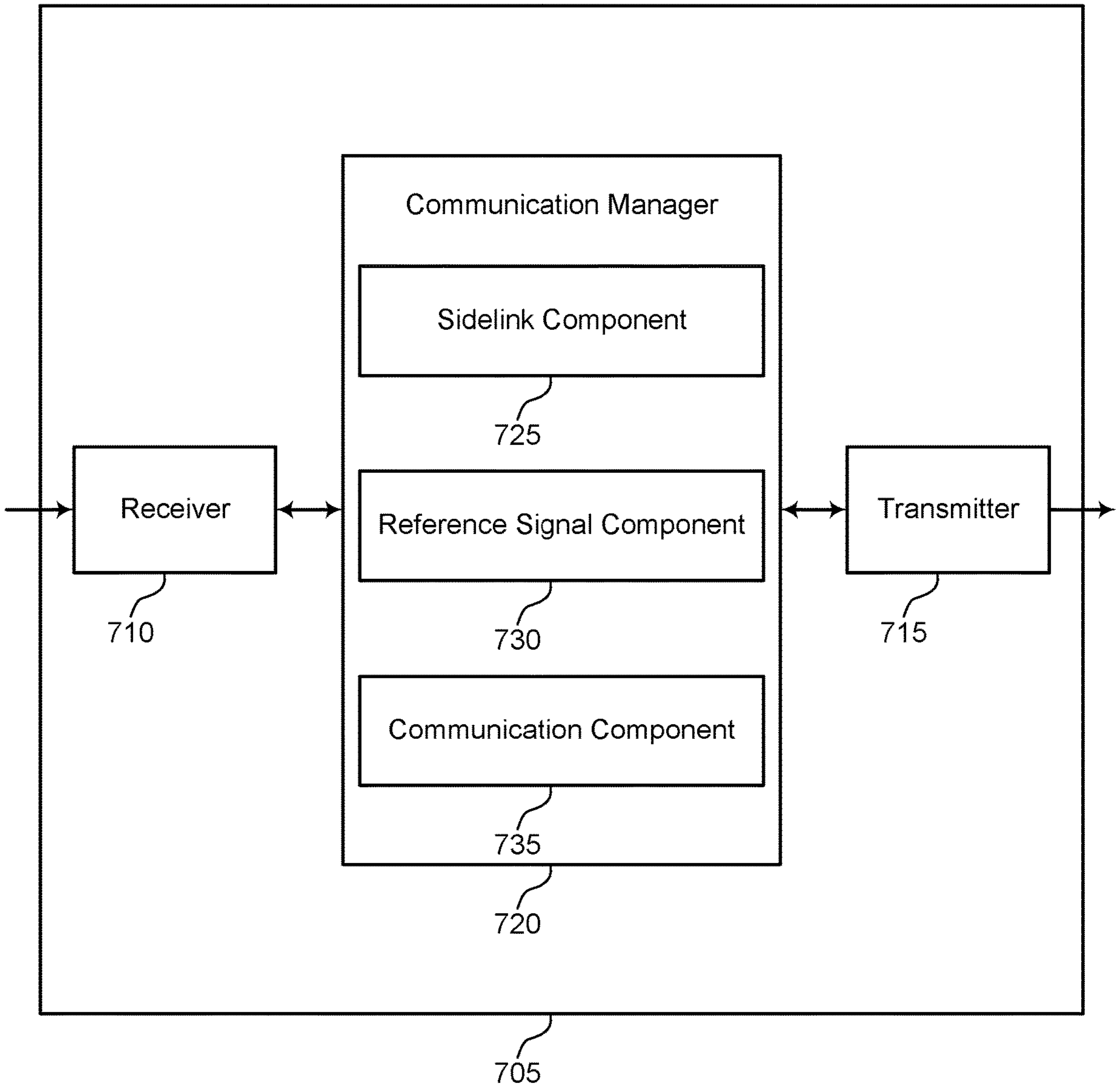

FIG. 7 illustrates a block diagram of a device 705 that supports reference signal transmission for beam management in sidelink in accordance with one or more aspects of the present disclosure. The device 705 may be an example of aspects of a device 605 or a UE 115. The device 705 may include a receiver 710, a transmitter 715, and a communication manager 720. The communication manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to reference signal transmission for beam management in sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to reference signal transmission for beam management in sidelink). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of reference signal transmission for beam management in sidelink. For example, the communication manager 720 may include a sidelink component 725, a reference signal component 730, a communication component 735, or any combination thereof. In some examples, the communication manager 720, or various components thereof, may be configured to perform various operations (for example, receiving, obtaining, monitoring, outputting, transmitting) using or otherwise in cooperation with the receiver 710, the transmitter 715, or both. For example, the communication manager 720 may receive information from the receiver 710, send information to the transmitter 715, or be integrated in combination with the receiver 710, the transmitter 715, or both to obtain information, output information, or perform various other operations.

The communication manager 720 may support wireless communication at a first UE in accordance with examples as disclosed herein. The sidelink component 725 may be configured as or otherwise support a means for establishing a sidelink communication link for performing one or more sidelink communication with a second UE. The reference signal component 730 may be configured as or otherwise support a means for transmitting, to the second UE via the sidelink communication link as part of a beam management procedure, a first reference signal using a first beam over a first symbol of a sidelink slot, and a second reference signal using a second beam over a second symbol of the sidelink slot. The communication component 735 may be configured as or otherwise support a means for communicating with the second UE using one of the first beam or the second beam in accordance with transmitting the first reference signal and the second reference signal as part of the beam management procedure.

Additionally, or alternatively, the communication manager 720 may support wireless communication at a second UE in accordance with examples as disclosed herein. The sidelink component 725 may be configured as or otherwise support a means for establishing a sidelink communication link for performing one or more sidelink communication with a first UE. The reference signal component 730 may be configured as or otherwise support a means for receiving, from the first UE via the sidelink communication link as part of a beam management procedure, a first reference signal associated with a first beam over a first symbol of a sidelink slot, and a second reference signal associated with a second beam over a second symbol of the sidelink slot. The communication component 735 may be configured as or otherwise support a means for communicating with the first UE using one of the first beam or the second beam in accordance with receiving the first reference signal and the second reference signal as part of the beam management procedure.

Figure 8:
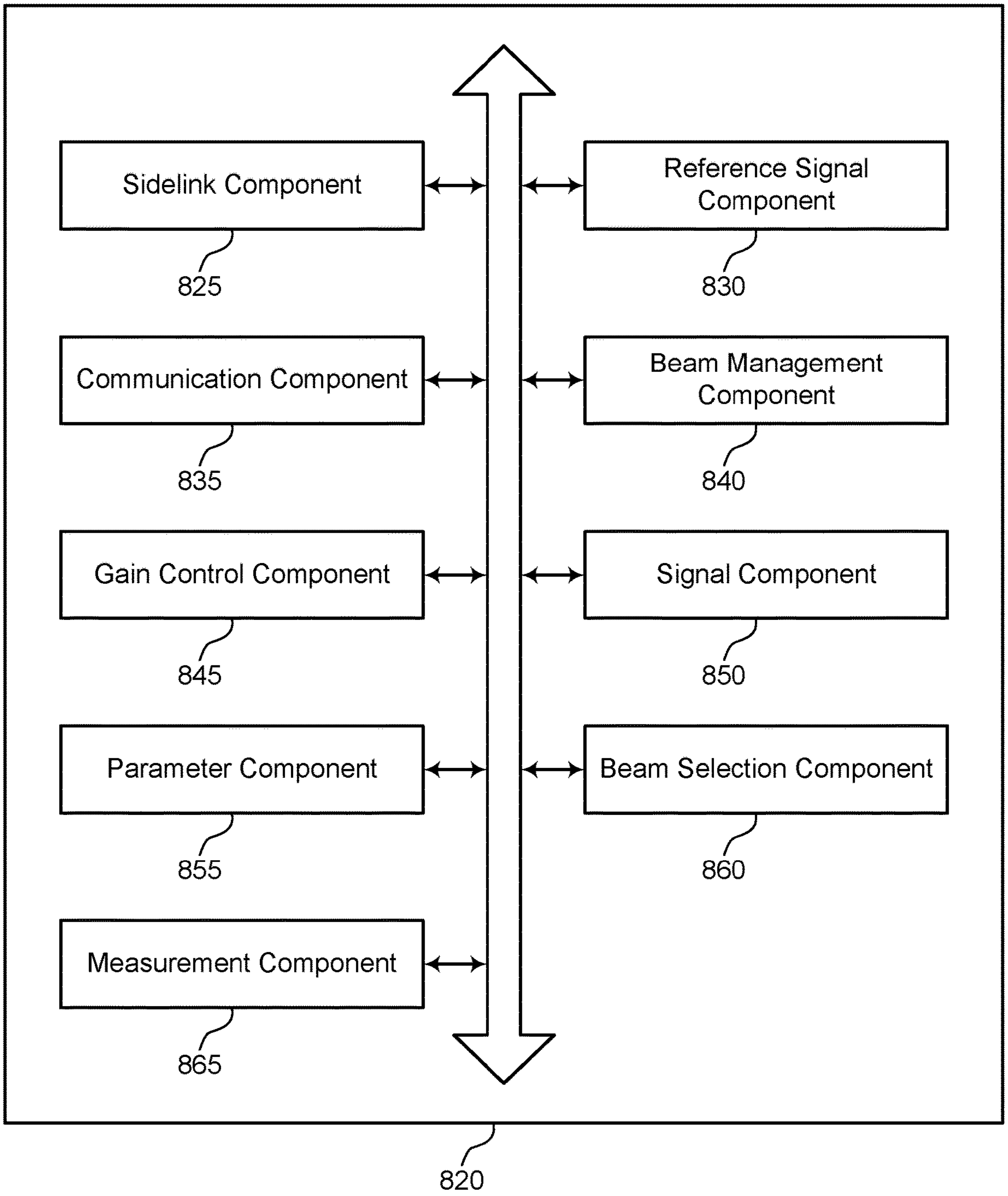
FIG. 8 illustrates a block diagram of a communication manager that supports reference signal transmission for beam management in sidelink in accordance with one or more aspects of the present disclosure.

FIG. 8 illustrates a block diagram of a communication manager 820 that supports reference signal transmission for beam management in sidelink in accordance with one or more aspects of the present disclosure. The communication manager 820, or various components thereof, may be an example of means for performing various aspects of reference signal transmission for beam management in sidelink. For example, the communication manager 820 may include a sidelink component 825, a reference signal component 830, a communication component 835, a beam management component 840, a gain control component 845, a signal component 850, a parameter component 855, a beam selection component 860, a measurement component 865, or any combination thereof. Each of these components may communicate, directly or indirectly, with one another (for example, via one or more buses).

The communication manager 820 may support wireless communication at a first UE in accordance with examples as disclosed herein. The sidelink component 825 may be configured as or otherwise support a means for establishing a sidelink communication link for performing one or more sidelink communication with a second UE. The reference signal component 830 may be configured as or otherwise support a means for transmitting, to the second UE via the sidelink communication link as part of a beam management procedure, a first reference signal using a first beam over a first symbol of a sidelink slot, and a second reference signal using a second beam over a second symbol of the sidelink slot. The communication component 835 may be configured as or otherwise support a means for communicating with the second UE using one of the first beam or the second beam in accordance with transmitting the first reference signal and the second reference signal as part of the beam management procedure.

In some examples, the beam management procedure may be associated with a first set of one or more beams having a first beam width and a second set of one or more beams having a second beam width less than the first beam width, in which the second set of one or more beams includes the first beam, and in which communicating with the second UE using one of the first beam or the second beam is in accordance with the beam management procedure. In some examples, the second set of one or more beams further includes the second beam. In some examples, the first set of one or more beams includes the second beam.

In some examples, to support the beam management procedure, the parameter component 855 may be configured as or otherwise support a means for receiving, from the second UE via the sidelink communication link in accordance with transmitting the first reference signal and the second reference signal, a signal indicating one or more parameters associated with one or both of the first beam or the second beam. In some examples, to support the beam management procedure, the beam selection component 860 may be configured as or otherwise support a means for selecting the first beam for communicating with the second UE in accordance with the one or more parameters.

In some examples, the gain control component 845 may be configured as or otherwise support a means for transmitting, over one or more third symbols of the sidelink slot using one or more of the first beam or the second beam, a gain control signal for a gain control operation, the gain control operation associated with a first set of one or more beams having a first beam width and a second set of one or more beams having a second beam width less than the first beam width. In some examples, the second set of one or more beams includes one or both of the first beam or the second beam.

In some examples, the gain control signal is transmitted using a third beam of the first set of one or more beams and transmitted at a first power level higher than a second power level at which one or both of the first reference signal or the second reference signal are transmitted.

In some examples, the signal component 850 may be configured as or otherwise support a means for transmitting, to a third UE, the gain control signal using the third beam and one or more signals using the third beam over one or more fourth symbols of the sidelink slot.

In some examples, the gain control signal is transmitted using a third beam of the first set of one or more beams and transmitted at a first power level higher than a second power level at which one or more signals are transmitted using a fourth beam of the first set of one or more beams.

In some examples, the gain control signal is transmitted using a third beam of the second set of one or more beams having the second beam width less than the first beam width and transmitted at a first power level higher than a second power level at which one or both of the first reference signal or the second reference signal are transmitted.

In some examples, transmitting the gain control signal using the third beam of the second set of one or more beams is in accordance with a third power level associated with transmitting the gain control signal using a fourth beam of the first set of one or more beams satisfying a power level threshold.

In some examples, the signal component 850 may be configured as or otherwise support a means for transmitting one or more signals using a third beam over one or more third symbols of the sidelink slot.

In some examples, the one or more signals indicate one or more of a beam management procedure, a beam, a symbol, or a power offset for communicating with the second UE using one of the first beam or the second beam. In some examples, the one or more signals include at least a bit in a first control message indicating the beam management procedure and one or more bits in a second control message indicating one or more of the first beam. The one or more bits may indicate one or more of the second beam, the third beam, the first symbol, the second symbol, the one or more third symbols, or one or more power offsets, the one or more power offsets corresponding to one or more of the first reference signal, the second reference signal, or a gain control signal.

In some examples, the parameter component 855 may be configured as or otherwise support a means for receiving, from the second UE via the sidelink communication link in accordance with transmitting the first reference signal and the second reference signal, a MAC-CE signal indicating one or more parameters associated with one or both of the first beam or the second beam. In some examples, communicating with the second UE using one of the first beam or the second beam is in accordance with the MAC-CE signal indicating the one or more parameters.

In some examples, the one or more parameters include one or more RIs, one or more CQIs, one or more RSRPs, or any combination thereof.

In some examples, the first symbol and the second symbol are the last-in-time two symbols of the sidelink slot.

In some examples, one or more first resources of the first reference signal occupy each resource element of the first symbol, one or more second resources of the second reference signal occupy each resource element of the second symbol, or both.

Additionally, or alternatively, the communication manager 820 may support wireless communication at a second UE in accordance with examples as disclosed herein. In some examples, the sidelink component 825 may be configured as or otherwise support a means for establishing a sidelink communication link for performing one or more sidelink communication with a first UE. In some examples, the reference signal component 830 may be configured as or otherwise support a means for receiving, from the first UE via the sidelink communication link as part of a beam management procedure, a first reference signal associated with a first beam over a first symbol of a sidelink slot, and a second reference signal associated with a second beam over a second symbol of the sidelink slot. In some examples, the communication component 835 may be configured as or otherwise support a means for communicating with the first UE using one of the first beam or the second beam in accordance with receiving the first reference signal and the second reference signal as part of the beam management procedure.

In some examples, the beam management procedure may be associated with a first set of one or more beams having a first beam width and a second set of one or more beams having a second beam width less than the first beam width, the second set of one or more beams including the first beam. In some examples, the second set of one or more beams further includes the second beam. In some examples, the first set of one or more beams includes the second beam.

In some examples, to support the beam management procedure, the measurement component 865 may be configured as or otherwise support a means for performing one or more measurements in accordance with receiving the first reference signal associated with the first beam and the second reference signal associated with the second beam to determine one or more parameters associated with one or both of the first reference signal or the second reference signal. In some examples, to support the beam management procedure, the parameter component 855 may be configured as or otherwise support a means for transmitting, to the first UE via the sidelink communication link, a signal indicating the one or more parameters. In some examples, communicating with the first UE using one of the first beam or the second beam is in accordance with transmitting the signal.

In some examples, the one or more parameters include one or more RIs, one or more CQIs, one or more RSRPs, or any combination thereof. In some examples, the signal includes a MAC-CE signal.

In some examples, the gain control component 845 may be configured as or otherwise support a means for receiving, over one or more third symbols of the sidelink slot and associated with one or more of the first beam or the second beam, a gain control signal for a gain control operation, the gain control operation associated with a first set of one or more beams having a first beam width and a second set of one or more beams having a second beam width less than the first beam width. In some examples, the second set of one or more beams includes one or both of the first beam or the second beam.

In some examples, the gain control signal is associated with a third beam of the first set of one or more beams and received at a first power level higher than a second power level at which one or both of the first reference signal or the second reference signal are received.

In some examples, the gain control signal is associated with a third beam of the first set of one or more beams and received at a first power level higher than a second power level at which one or more signals associated with a fourth beam of the first set of one or more beams are received.

In some examples, the gain control signal is associated with a third beam of the second set of one or more beams having the second beam width less than the first beam width and received at a first power level higher than a second power level at which one or more of the first reference signal or the second reference signal are received.

In some examples, receiving the gain control signal associated with the third beam of the second set of one or more beams is in accordance with a third power level satisfying a power level threshold, the third power level associated with the gain control signal and a fourth beam of the first set of one or more beams.

In some examples, the signal component 850 may be configured as or otherwise support a means for receiving one or more signals associated with a third beam over one or more third symbols of the sidelink slot.

In some examples, the one or more signals indicate one or more of a beam management procedure, a beam, a symbol, or a power offset for communicating with the first UE using one of the first beam or the second beam. In some examples, the one or more signals include at least a bit in a first control message indicating the beam management procedure and one or more bits in a second control message indicating one or more of the first beam. The one or more bits may indicate one or more of the second beam, the third beam, the first symbol, the second symbol, the one or more third symbols, or one or more power offsets, the one or more power offsets corresponding to one or more of the first reference signal, the second reference signal, or a gain control signal.

In some examples, the first symbol and the second symbol are the last-in-time two symbols of the sidelink slot.

In some examples, one or more first resources of the first reference signal occupy each resource element of the first symbol, one or more second resources of the second reference signal occupy each resource element of the second symbol, or both.

Figure 9:
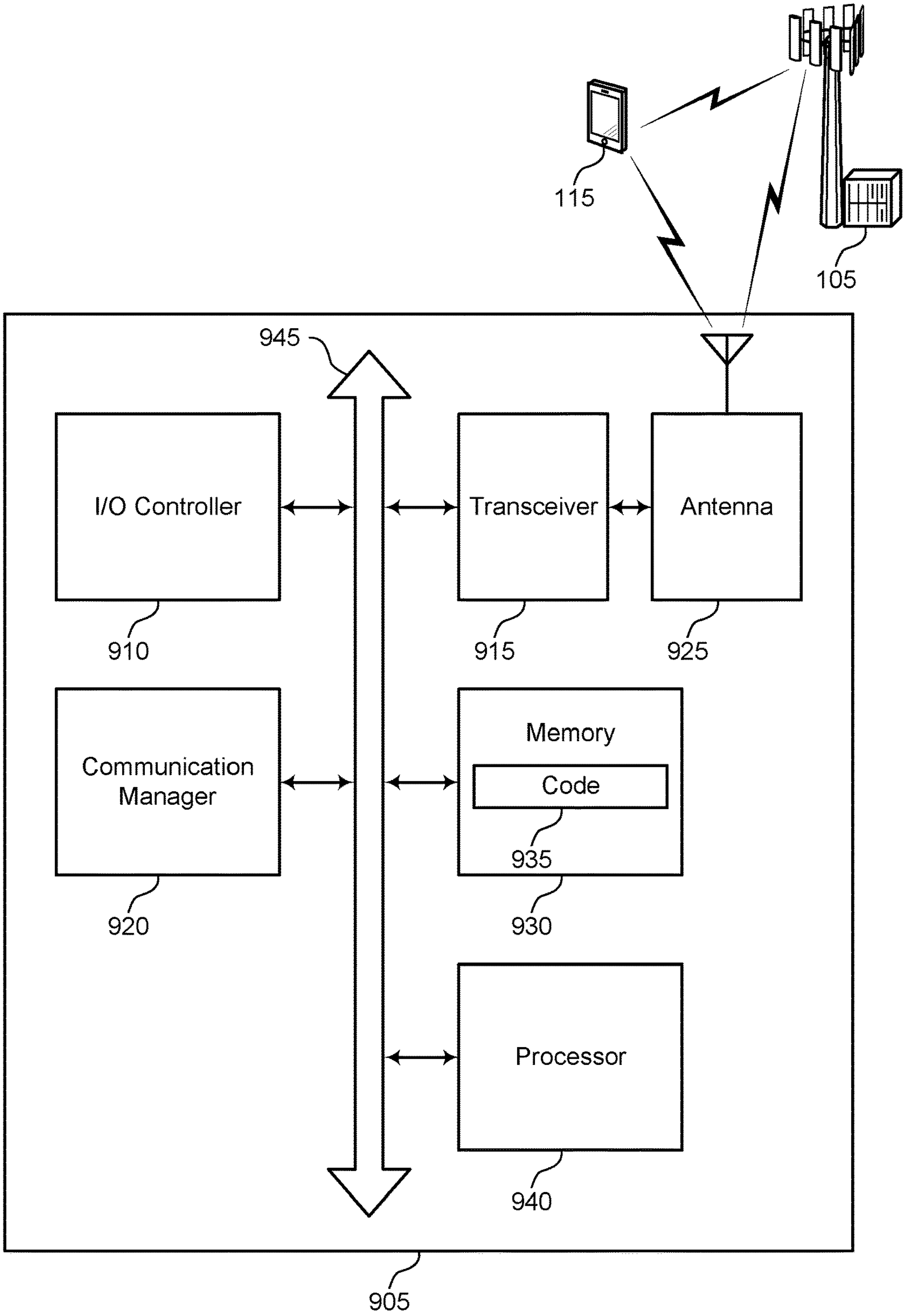
FIG. 9 illustrates a diagram of a system including a device that supports reference signal transmission for beam management in sidelink in accordance with one or more aspects of the present disclosure.

FIG. 9 illustrates a diagram of a system including a device 905 that supports reference signal transmission for beam management in sidelink in accordance with one or more aspects of the present disclosure. The device 905 may be an example of or include the components of a device 605, a device 705, or a UE 115. The device 905 may communicate (for example, wirelessly) with one or more network entities 105, one or more UEs 115, or any combination thereof. The device 905 may include components for bi-directional voice and data communication including components for transmitting and receiving communications, such as a communication manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (for example, when compiled and executed) to perform functions described with reference to FIGS. 1-14. In some cases, the memory 930 may contain, among other things, a basic I/O system (BIOS) which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting reference signal transmission for beam management in sidelink). For example, the device 905 or a component of the device 905 may include a processor 940 and memory 930 coupled with or to the processor 940, the processor 940 and memory 930 configured to perform various functions described with reference to FIGS. 1-14.

The communication manager 920 may support wireless communication at a first UE in accordance with examples as disclosed herein. For example, the communication manager 920 may be configured as or otherwise support a means for establishing a sidelink communication link for performing one or more sidelink communication with a second UE. The communication manager 920 may be configured as or otherwise support a means for transmitting, to the second UE via the sidelink communication link as part of a beam management procedure, a first reference signal using a first beam over a first symbol of a sidelink slot, and a second reference signal using a second beam over a second symbol of the sidelink slot. The communication manager 920 may be configured as or otherwise support a means for communicating with the second UE using one of the first beam or the second beam in accordance with transmitting the first reference signal and the second reference signal as part of the beam management procedure.

Additionally, or alternatively, the communication manager 920 may support wireless communication at a second UE in accordance with examples as disclosed herein. For example, the communication manager 920 may be configured as or otherwise support a means for establishing a sidelink communication link for performing one or more sidelink communication with a first UE. The communication manager 920 may be configured as or otherwise support a means for receiving, from the first UE via the sidelink communication link as part of a beam management procedure, a first reference signal associated with a first beam over a first symbol of a sidelink slot, and a second reference signal associated with a second beam over a second symbol of the sidelink slot. The communication manager 920 may be configured as or otherwise support a means for communicating with the first UE using one of the first beam or the second beam in accordance with receiving the first reference signal and the second reference signal as part of the beam management procedure.

By including or configuring the communication manager 920 in accordance with examples, the device 905 may support techniques for improved communication reliability by adjusting a power of CSI-RSs, AGC signals, and one or more signals, as well as reduced latency, reduced power consumption, and improved coordination between devices by performing beam refinement.

In some examples, the communication manager 920 may be configured to perform various operations (for example, receiving, monitoring, transmitting) using or otherwise in cooperation with the transceiver 915, the one or more antennas 925, or any combination thereof. Although the communication manager 920 is illustrated as a separate component, in some examples, one or more functions described with reference to the communication manager 920 may be supported by or performed by the processor 940, the memory 930, the code 935, or any combination thereof. For example, the code 935 may include instructions executable by the processor 940 to cause the device 905 to perform various aspects of reference signal transmission for beam management in sidelink, or the processor 940 and the memory 930 may be otherwise configured to perform or support such operations.

Figure 10:
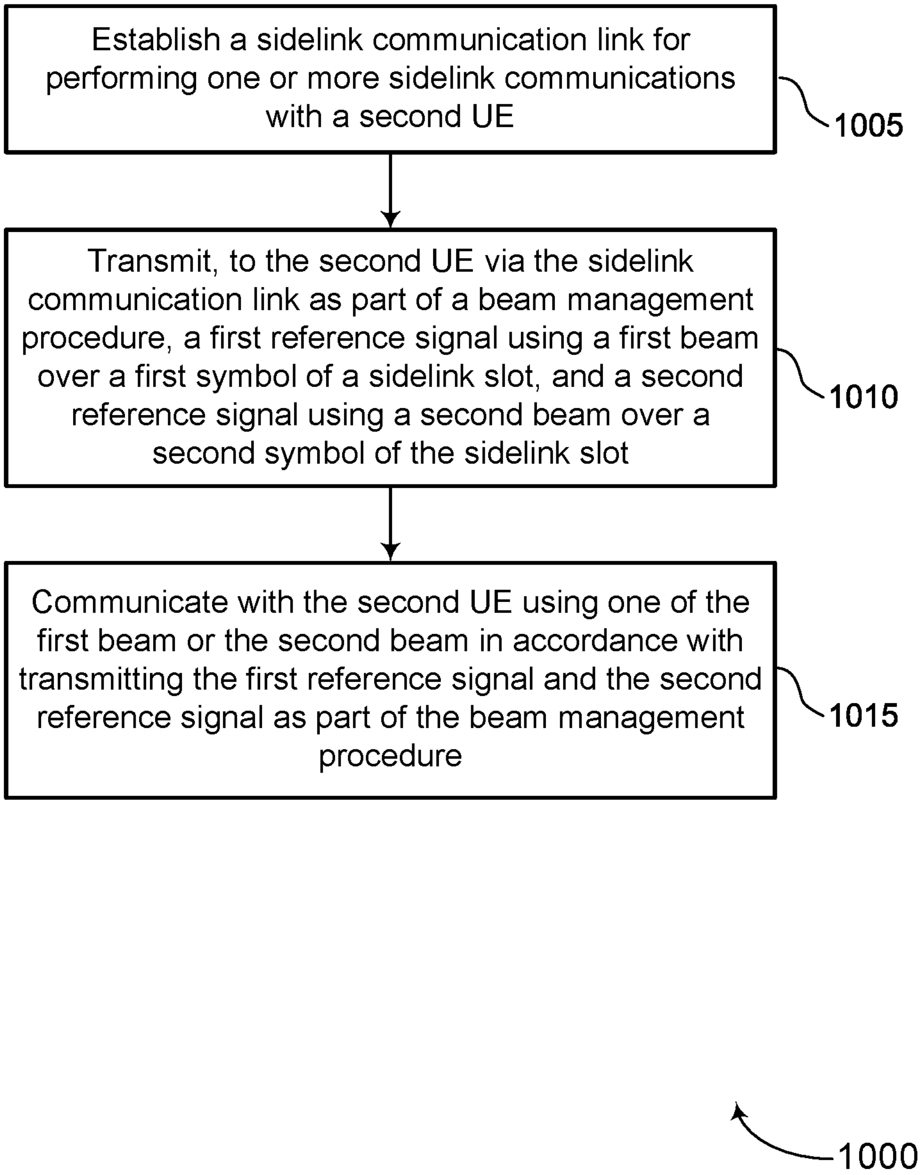
FIGS. 10 through 14 illustrate flowcharts showing methods that support reference signal transmission for beam management in sidelink in accordance with one or more aspects of the present disclosure.

FIG. 10 illustrates a flowchart showing a method 1000 that supports reference signal transmission for beam management in sidelink in accordance with one or more aspects of the present disclosure. The operations of the method 1000 may be implemented by a UE or its components. For example, the operations of the method 1000 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1005, the method may include establishing a sidelink communication link for performing one or more sidelink communication with a second UE. The operations of 1005 may be performed in accordance with examples as disclosed herein. In some examples, aspects of the operations of 1005 may be performed by a sidelink component 825 as described with reference to FIG. 8.

At 1010, the method may include transmitting, to the second UE via the sidelink communication link as part of a beam management procedure, a first reference signal using a first beam over a first symbol of a sidelink slot, and a second reference signal using a second beam over a second symbol of the sidelink slot. The operations of 1010 may be performed in accordance with examples as disclosed herein. In some examples, aspects of the operations of 1010 may be performed by a reference signal component 830 as described with reference to FIG. 8.

At 1015, the method may include communicating with the second UE using one of the first beam or the second beam in accordance with transmitting the first reference signal and the second reference signal as part of the beam management procedure. The operations of 1015 may be performed in accordance with examples as disclosed herein. In some examples, aspects of the operations of 1015 may be performed by a communication component 835 as described with reference to FIG. 8.

Figure 11:
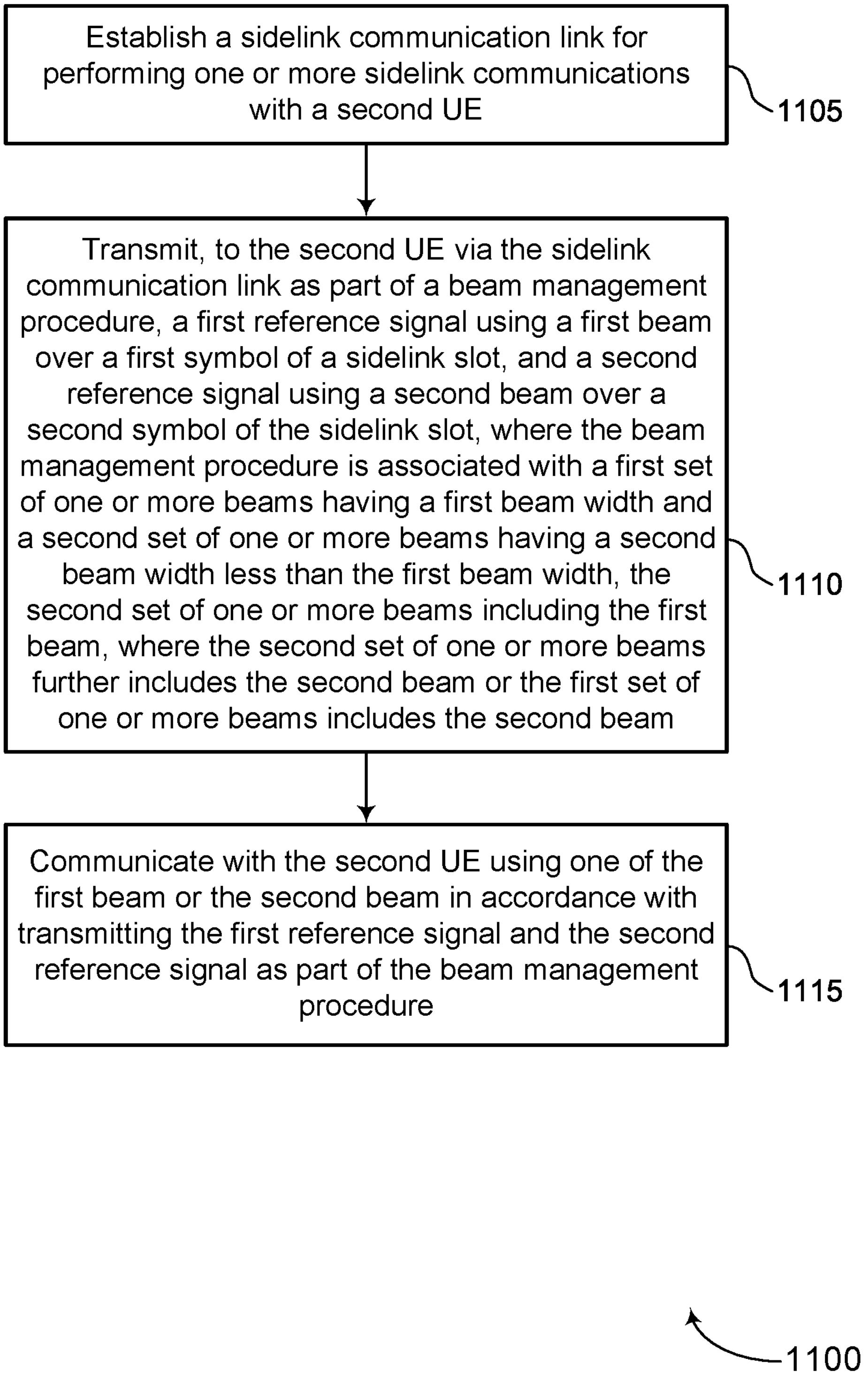

FIG. 11 illustrates a flowchart showing a method 1100 that supports reference signal transmission for beam management in sidelink in accordance with one or more aspects of the present disclosure. The operations of the method 1100 may be implemented by a UE or its components. For example, the operations of the method 1100 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1105, the method may include establishing a sidelink communication link for performing one or more sidelink communication with a second UE. The operations of 1105 may be performed in accordance with examples as disclosed herein. In some examples, aspects of the operations of 1105 may be performed by a sidelink component 825 as described with reference to FIG. 8.

At 1110, the method may include transmitting, to the second UE via the sidelink communication link as part of a beam management procedure, a first reference signal using a first beam over a first symbol of a sidelink slot, and a second reference signal using a second beam over a second symbol of the sidelink slot. The beam management procedure may be associated with a first set of one or more beams having a first beam width and a second set of one or more beams having a second beam width less than the first beam width, the second set of one or more beams including the first beam, in which the second set of one or more beams further includes the second beam or the first set of one or more beams includes the second beam. The operations of 1110 may be performed in accordance with examples as disclosed herein. In some examples, aspects of the operations of 1110 may be performed by a reference signal component 830 as described with reference to FIG. 8. In some examples, aspects of the operations of 1110, such as the beam management procedure, may be performed by a beam management component 840 as described with reference to FIG. 8.

At 1115, the method may include communicating with the second UE using one of the first beam or the second beam in accordance with transmitting the first reference signal and the second reference signal as part of the beam management procedure. The operations of 1115 may be performed in accordance with examples as disclosed herein. In some examples, aspects of the operations of 1115 may be performed by a communication component 835 as described with reference to FIG. 8.

Figure 12:
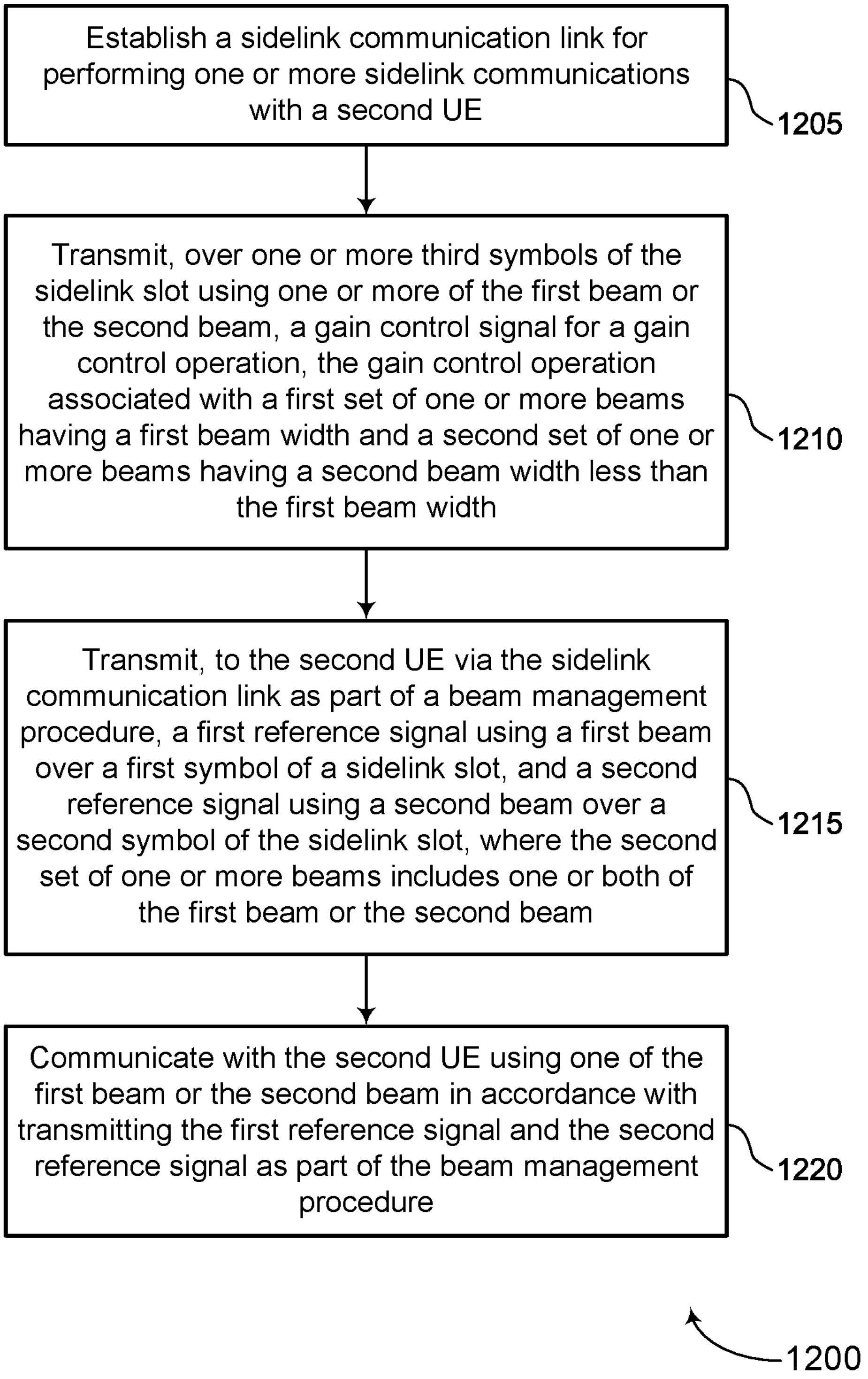

FIG. 12 illustrates a flowchart showing a method 1200 that supports reference signal transmission for beam management in sidelink in accordance with one or more aspects of the present disclosure. The operations of the method 1200 may be implemented by a UE or its components. For example, the operations of the method 1200 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1205, the method may include establishing a sidelink communication link for performing one or more sidelink communications with a second UE. The operations of 1205 may be performed in accordance with examples as disclosed herein. In some examples, aspects of the operations of 1205 may be performed by a sidelink component 825 as described with reference to FIG. 8.

At 1210, the method may include transmitting, over one or more third symbols of the sidelink slot using one or more of the first beam or the second beam, a gain control signal for a gain control operation, the gain control operation associated with a first set of one or more beams having a first beam width and a second set of one or more beams having a second beam width less than the first beam width. The operations of 1210 may be performed in accordance with examples as disclosed herein. In some examples, aspects of the operations of 1210 may be performed by a gain control component 845 as described with reference to FIG. 8.

At 1215, the method may include transmitting, to the second UE via the sidelink communication link as part of a beam management procedure, a first reference signal using a first beam over a first symbol of a sidelink slot, and a second reference signal using a second beam over a second symbol of the sidelink slot. In some examples, the second set of one or more beams includes one or both of the first beam or the second beam. The operations of 1215 may be performed in accordance with examples as disclosed herein. In some examples, aspects of the operations of 1215 may be performed by a reference signal component 830 as described with reference to FIG. 8.

At 1220, the method may include communicating with the second UE using one of the first beam or the second beam in accordance with transmitting the first reference signal and the second reference signal as part of the beam management procedure. The operations of 1220 may be performed in accordance with examples as disclosed herein. In some examples, aspects of the operations of 1220 may be performed by a communication component 835 as described with reference to FIG. 8.

Figure 13:
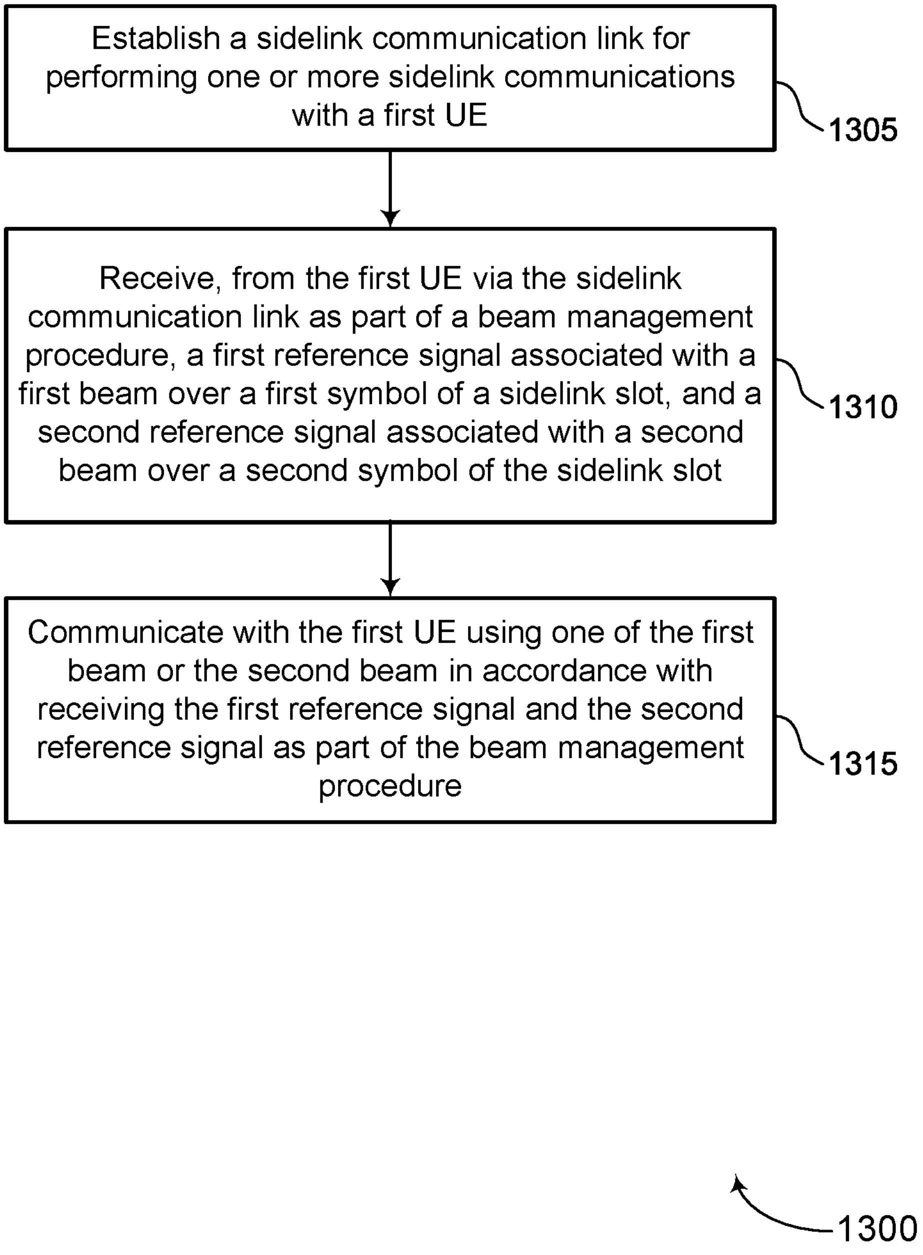

FIG. 13 illustrates a flowchart showing a method 1300 that supports reference signal transmission for beam management in sidelink in accordance with one or more aspects of the present disclosure. The operations of the method 1300 may be implemented by a UE or its components. For example, the operations of the method 1300 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1305, the method may include establishing a sidelink communication link for performing one or more sidelink communication with a first UE. The operations of 1305 may be performed in accordance with examples as disclosed herein. In some examples, aspects of the operations of 1305 may be performed by a sidelink component 825 as described with reference to FIG. 8.

At 1310, the method may include receiving, from the first UE via the sidelink communication link as part of a beam management procedure, a first reference signal associated with a first beam over a first symbol of a sidelink slot, and a second reference signal associated with a second beam over a second symbol of the sidelink slot. The operations of 1310 may be performed in accordance with examples as disclosed herein. In some examples, aspects of the operations of 1310 may be performed by a reference signal component 830 as described with reference to FIG. 8.

At 1315, the method may include communicating with the first UE using one of the first beam or the second beam in accordance with receiving the first reference signal and the second reference signal as part of the beam management procedure. The operations of 1315 may be performed in accordance with examples as disclosed herein. In some examples, aspects of the operations of 1315 may be performed by a communication component 835 as described with reference to FIG. 8.

Figure 14:
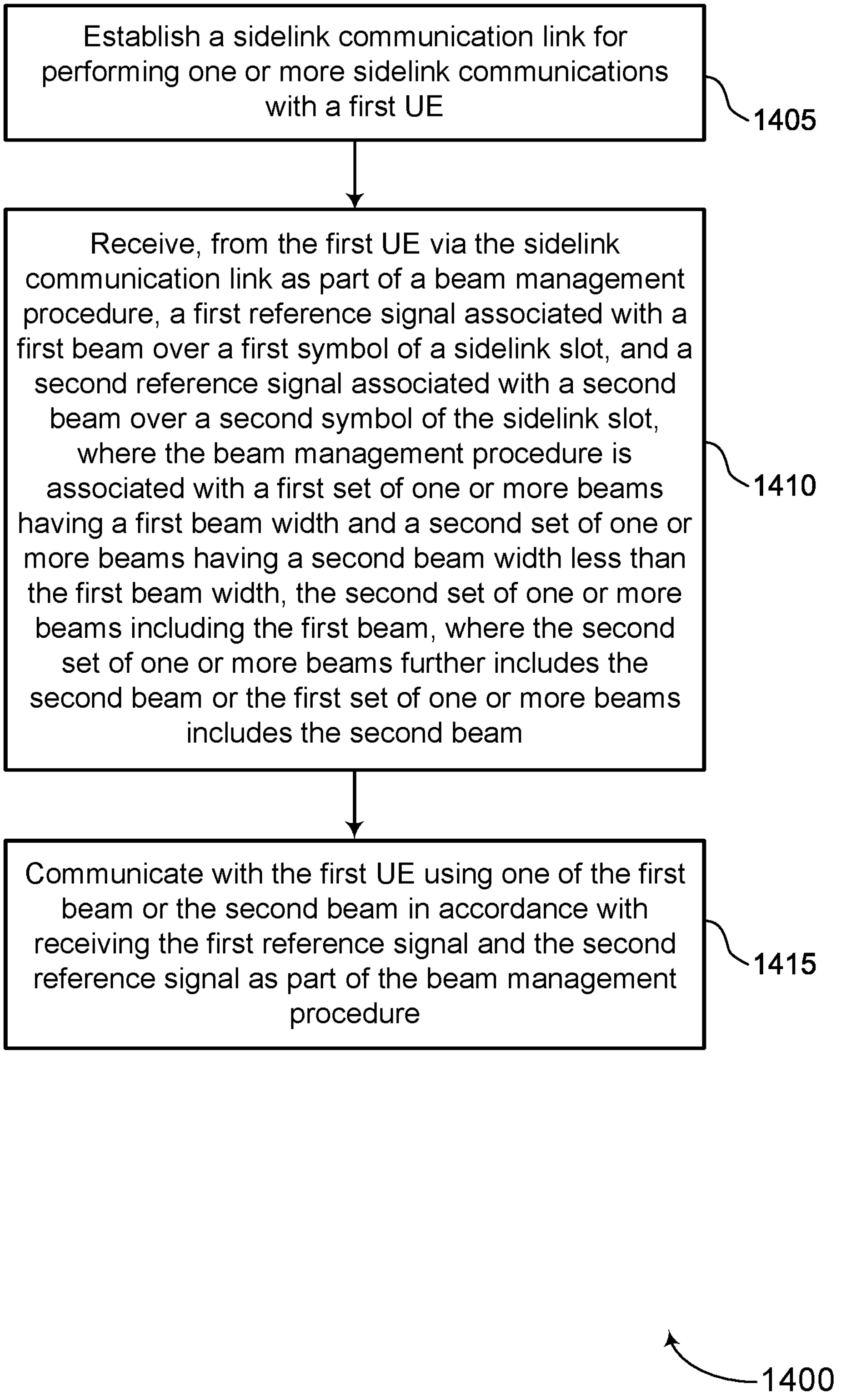

FIG. 14 illustrates a flowchart showing a method 1400 that supports reference signal transmission for beam management in sidelink in accordance with one or more aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1405, the method may include establishing a sidelink communication link for performing one or more sidelink communication with a first UE. The operations of 1405 may be performed in accordance with examples as disclosed herein. In some examples, aspects of the operations of 1405 may be performed by a sidelink component 825 as described with reference to FIG. 8.

At 1410, the method may include receiving, from the first UE via the sidelink communication link as part of a beam management procedure, a first reference signal associated with a first beam over a first symbol of a sidelink slot, and a second reference signal associated with a second beam over a second symbol of the sidelink slot. The beam management procedure may be associated with a first set of one or more beams having a first beam width and a second set of one or more beams having a second beam width less than the first beam width, the second set of one or more beams including the first beam, in which the second set of one or more beams further includes the second beam or the first set of one or more beams includes the second beam The operations of 1410 may be performed in accordance with examples as disclosed herein. In some examples, aspects of the operations of 1410 may be performed by a reference signal component 830 as described with reference to FIG. 8. In some examples, aspects of the operations of 1410, such as the beam management procedure, may be performed by a beam management component 840 as described with reference to FIG. 8.

At 1415, the method may include communicating with the first UE using one of the first beam or the second beam in accordance with receiving the first reference signal and the second reference signal as part of the beam management procedure. The operations of 1415 may be performed in accordance with examples as disclosed herein. In some examples, aspects of the operations of 1415 may be performed by a communication component 835 as described with reference to FIG. 8.

The following provides an overview of aspects of the present disclosure:

Aspect 1: A method for wireless communication at a first UE, including: transmitting, to a second UE via a sidelink communication link as part of a beam management procedure, a first reference signal using a first beam over a first symbol of a sidelink slot, and a second reference signal using a second beam over a second symbol of the sidelink slot; and communicating with the second UE using one of the first beam or the second beam in accordance with transmitting the first reference signal and the second reference signal as part of the beam management procedure.

Aspect 2: The method of aspect 1, in which the beam management procedure is associated with a first set of one or more beams having a first beam width and a second set of one or more beams having a second beam width less than the first beam width, in which the second set of one or more beams includes the first beam and the second beam.

Aspect 3: The method of aspect 1, in which the beam management procedure is associated with a first set of one or more beams having a first beam width and a second set of one or more beams having a second beam width less than the first beam width, in which the second set of one or more beams includes the first beam, and in which the first set of one or more beams includes the second beam.

Aspect 4: The method of any of aspects 2 through 3, in which, as part of the beam management procedure, the method further includes: receiving, from the second UE via the sidelink communication link in accordance with transmitting the first reference signal and the second reference signal, a signal indicating one or more parameters associated with one or both of the first beam or the second beam; and selecting one of the first beam or the second beam for communicating with the second UE in accordance with the one or more parameters.

Aspect 5: The method of any of aspects 1 through 4, further including: transmitting, over one or more third symbols of the sidelink slot using one or more of the first beam or the second beam, a gain control signal for a gain control operation, the gain control operation associated with a first set of one or more beams having a first beam width and a second set of one or more beams having a second beam width less than the first beam width, in which the second set of one or more beams includes one or both of the first beam or the second beam.

Aspect 6: The method of aspect 5, in which the gain control signal is transmitted using a third beam of the first set of one or more beams and transmitted at a first power level higher than a second power level at which one or both of the first reference signal or the second reference signal are transmitted.

Aspect 7: The method of aspect 6, further including: transmitting, to a third UE, the gain control signal using the third beam and one or more signals using the third beam over one or more fourth symbols of the sidelink slot.

Aspect 8: The method of aspect 5, in which the gain control signal is transmitted using a third beam of the first set of one or more beams and transmitted at a first power level higher than a second power level at which one or more signals are transmitted using a fourth beam of the first set of one or more beams.

Aspect 9: The method of aspect 5, in which the gain control signal is transmitted using a third beam of the second set of one or more beams having the second beam width less than the first beam width and transmitted at a first power level higher than a second power level at which one or both of the first reference signal or the second reference signal are transmitted.

Aspect 10: The method of aspect 9, in which transmitting the gain control signal using the third beam of the second set of one or more beams is in accordance with a third power level associated with transmitting the gain control signal using a fourth beam of the first set of one or more beams satisfying a power level threshold.

Aspect 11: The method of any of aspects 1 through 6, further including: transmitting one or more signals using a third beam over one or more third symbols of the sidelink slot.

Aspect 12: The method of aspect 11, in which the one or more signals indicate one or more of a beam management procedure, a beam, a symbol, or a power offset for communicating with the second UE using one of the first beam or the second beam.

Aspect 13: The method of aspect 13, in which the one or more signals comprise at least a bit in a first control message indicating the beam management procedure and one or more bits in a second control message indicating one or more of the first beam, the second beam, the third beam, the first symbol, the second symbol, the one or more third symbols, or one or more power offsets, the one or more power offsets corresponding to one or more of the first reference signal, the second reference signal, or a gain control signal Aspect 14: The method of any of aspects 1 through 14, further including: receiving, from the second UE via the sidelink communication link in accordance with transmitting the first reference signal and the second reference signal, a medium access control control element signal indicating one or more parameters associated with one or both of the first beam or the second beam, in which communicating with the second UE using one of the first beam or the second beam is in accordance with the medium access control control element signal indicating the one or more parameters.

Aspect 15: The method of aspect 14, in which the one or more parameters include one or more rank indicators, one or more channel quality indicators, one or more reference signal received powers, or any combination thereof.

Aspect 16: The method of any of aspects 1 through 15, in which the first symbol and the second symbol are the last-in-time two symbols of the sidelink slot.

Aspect 17: The method of any of aspects 1 through 16, in which one or more first resources of the first reference signal occupy each resource element of the first symbol, or in which one or more second resources of the second reference signal occupy each resource element of the second symbol, or both.

Aspect 18: A method for wireless communication at a second UE, including: receiving, from a first UE via a sidelink communication link as part of a beam management procedure, a first reference signal associated with a first beam over a first symbol of a sidelink slot, and a second reference signal associated with a second beam over a second symbol of the sidelink slot; and communicating with the first UE using one of the first beam or the second beam in accordance with receiving the first reference signal and the second reference signal as part of the beam management procedure.

Aspect 19: The method of aspect 18, in which the beam management procedure is associated with a first set of one or more beams having a first beam width and a second set of one or more beams having a second beam width less than the first beam width, the second set of one or more beams including the first beam, in which the second set of one or more beams further includes the second beam or the first set of one or more beams includes the second beam.

Aspect 20: The method of aspect 19, in which, as part of the beam management procedure, the method further includes: performing one or more measurements in accordance with receiving the first reference signal associated with the first beam and the second reference signal associated with the second beam to determine one or more parameters associated with one or both of the first reference signal or the second reference signal; and transmitting, to the first UE via the sidelink communication link, a signal indicating the one or more parameters, in which communicating with the first UE using one of the first beam or the second beam is in accordance with transmitting the signal.

Aspect 21: The method of aspect 20, in which the one or more parameters comprise one or more rank indicators, one or more channel quality indicators, one or more reference signal received powers, or any combination thereof, and in which the signal includes a medium access control control element signal.

Aspect 22: The method of any of aspects 18 through 21, further including: receiving, over one or more third symbols of the sidelink slot and associated with one or more of the first beam or the second beam, a gain control signal for a gain control operation, the gain control operation associated with a first set of one or more beams having a first beam width and a second set of one or more beams having a second beam width less than the first beam width, in which the second set of one or more beams includes one or both of the first beam or the second beam.

Aspect 23: The method of aspect 22, in which the gain control signal is associated with a third beam of the first set of one or more beams and received at a first power level higher than a second power level at which one or both of the first reference signal or the second reference signal are received; or the gain control signal is associated with the third beam of the first set of one or more beams and received at a third power level higher than a fourth power level at which one or more signals associated with a fourth beam of the first set of one or more beams are received; or the gain control signal is associated with a fifth beam of the second set of one or more beams and received at a fifth power level higher than a sixth power level at which one or more of the first reference signal or the second reference signal are received; or any combination thereof.

Aspect 24: The method of aspect 24, in which receiving the gain control signal associated with the fifth beam of the second set of one or more beams is in accordance with a third power level satisfying a power level threshold, the third power level associated with the gain control signal and the third beam of the first set of one or more beams.

Aspect 25: The method of any of aspects 18 through 23, further including: receiving one or more signals associated with a third beam over one or more third symbols of the sidelink slot.

Aspect 26: The method of aspect 25, in which the one or more signals indicate one or more of a beam management procedure, a beam, a symbol, or a power offset for communicating with the first UE using one of the first beam or the second beam.

Aspect 27: The method of any of aspects 18 through 26, in which the first symbol and the second symbol are the last-in-time two symbols of the sidelink slot.

Aspect 28: The method of any of aspects 18 through 27, in which one or more first resources of the first reference signal occupy each resource element of the first symbol, or in which one or more second resources of the second reference signal occupy each resource element of the second symbol, or both.

Aspect 29: An apparatus for wireless communication at a first UE, including a processor; memory coupled with the processor; and instructions stored in the memory and executable by the processor to cause the apparatus to perform a method of any of aspects 1 through 17.

Aspect 30: An apparatus for wireless communication at a first UE, including at least one means for performing a method of any of aspects 1 through 17.

Aspect 31: A non-transitory computer-readable medium storing code for wireless communication at a first UE, the code including instructions executable by a processor to perform a method of any of aspects 1 through 17.

Aspect 32: An apparatus for wireless communication at a second UE, including a processor; memory coupled with the processor; and instructions stored in the memory and executable by the processor to cause the apparatus to perform a method of any of aspects 18 through 28.

Aspect 33: An apparatus for wireless communication at a second UE, including at least one means for performing a method of any of aspects 18 through 28.

Aspect 34: A non-transitory computer-readable medium storing code for wireless communication at a second UE, the code including instructions executable by a processor to perform a method of any of aspects 18 through 28.

It should be noted that the methods described herein describe possible implementations, and that the operations and the aspects may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example feature that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining, among other examples. Also, "determining" can include receiving (for example, receiving information), accessing (for example, accessing data stored in memory), among other examples. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

transmitting, to a second UE via a sidelink communication link as part of a beam management procedure, a first reference signal using a first beam over a first symbol of a sidelink slot, and a second reference signal using a second beam over a second symbol of the sidelink slot;

transmitting, over one or more third symbols of the sidelink slot using one or more of the first beam or the second beam, a gain control signal for a gain control operation, the gain control operation associated with a first set of one or more beams having a first beam width and a second set of one or more beams having a second beam width less than the first beam width, wherein the second set of one or more beams comprises one or both of the first beam or the second beam; and communicating with the second UE using one of the first beam or the second beam in accordance with transmitting the first reference signal and the second reference signal as part of the beam management procedure.

2. The method of claim 1, wherein the second set of one or more beams comprises the first beam and the second beam.

3. The method of claim 1, wherein the second set of one or more beams comprises the first beam, and wherein the first set of one or more beams comprises the second beam.

4. The method of claim 1, wherein, as part of the beam management procedure, the method further comprises:

receiving, from the second UE via the sidelink communication link in accordance with transmitting the first reference signal and the second reference signal, a signal indicating one or more parameters associated with one or both of the first beam or the second beam; and selecting one of the first beam or the second beam for communicating with the second UE in accordance with the one or more parameters.

5. The method of claim 1, wherein the gain control signal is transmitted using a third beam of the first set of one or more beams and transmitted at a first power level higher than a second power level at which one or both of the first reference signal or the second reference signal are transmitted.

6. The method of claim 5, further comprising transmitting, to a third UE, the gain control signal using the third beam and one or more signals using the third beam over one or more fourth symbols of the sidelink slot.

7. The method of claim 1, wherein the gain control signal is transmitted using a third beam of the first set of one or more beams and transmitted at a first power level higher than a second power level at which one or more signals are transmitted using a fourth beam of the first set of one or more beams.

8. The method of claim 1, wherein the gain control signal is transmitted using a third beam of the second set of one or more beams having the second beam width less than the first beam width and transmitted at a first power level higher than a second power level at which one or both of the first reference signal or the second reference signal are transmitted.

9. The method of claim 8, wherein transmitting the gain control signal using the third beam of the second set of one or more beams is in accordance with a third power level associated with transmitting the gain control signal using a fourth beam of the first set of one or more beams satisfying a power level threshold.

10. A method for wireless communication at a first user equipment (UE), comprising:

transmitting, to a second UE via a sidelink communication link as part of a beam management procedure, a first reference signal using a first beam over a first symbol of a sidelink slot, and a second reference signal using a second beam over a second symbol of the sidelink slot, wherien the beam management procedure is associated with a first set of one or more beams having a first beam width and a second set of one or more beams having a second beam width less than the first beam width, the second set of one or more beams comprising the first beam, wherein the second set of one or more beams further comprises the second beam or the first set of one or more beams comprises the second beam;

transmitting one or more signals using a third beam over one or more third symbols of the sidelink slot; and communicating with the second UE using one of the first beam or the second beam in accordance with transmitting the first reference signal and the second reference signal as part of the beam management procedure, wherein the one or more signals indicate one or more of the beam management procedure, a beam, a symbol, or a power offset for communicating with the second UE using one of the first beam or the second beam.

11. The method of claim 10, wherein the one or more signals comprise at least a bit in a first control message indicating the beam management procedure and one or more bits in a second control message indicating one or more of the first beam, the second beam, the third beam, the first symbol, the second symbol, the one or more third symbols, or one or more power offsets, the one or more power offsets corresponding to one or more of the first reference signal, the second reference signal, or a gain control signal.

12. A method for wireless communication at a first user equipment (UE), comprising:

transmitting, to a second UE via a sidelink communication link as part of a beam management procedure, a first reference signal using a first beam over a first symbol of a sidelink slot, and a second reference signal using a second beam over a second symbol of the sidelink slot, wherein the beam management procedure is associated with a first set of one or more beams having a first beam width and a second set of one or more beams having a second beam width less than the first beam width, the second set of one or more beams comprising the first beam, wherein the second set of one or more beams further comprises the second beam or the first set of one or more beams comprises the second beam;

receiving, from the second UE via the sidelink communication link in accordance with transmitting the first reference signal and the second reference signal, a medium access control control element signal indicating one or more parameters associated with one or both of the first beam or the second beam; and communicating with the second UE using one of the first beam or the second beam in accordance with transmitting the first reference signal and the second reference signal as part of the beam management procedure, wherein communicating with the second UE using one of the first beam or the second beam is in accordance with the medium access control control element signal indicating the one or more parameters.

13. The method of claim 12, wherein the one or more parameters comprise one or more rank indicators, one or more channel quality indicators, one or more reference signal received powers, or any combination thereof.

14. The method of claim 1, wherein the first symbol and the second symbol are the last-in-time two symbols of the sidelink slot.

15. The method of claim 1, wherein one or more first resources of the first reference signal occupy each resource element of the first symbol, or wherein one or more second resources of the second reference signal occupy each resource element of the second symbol, or both.

16. A method for wireless communication at a second user equipment (UE), comprising:

receiving, from a first UE via a sidelink communication link as part of a beam management procedure, a first reference signal associated with a first beam over a first symbol of a sidelink slot, and a second reference signal associated with a second beam over a second symbol of the sidelink slot, wherein the beam management procedure is associated with a first set of one or more beams having a first beam width and a second set of one or more beams having a second beam width less than the first beam width, the second set of one or more beams comprising the first beam, wherein the second set of one or more beams further comprises the second beam or the first set of one or more beams comprises the second beam; and communicating with the first UE using one of the first beam or the second beam in accordance with receiving the first reference signal and the second reference signal as part of the beam management procedure.

17. The method of claim 16, wherein, as part of the beam management procedure, the method further comprises:

performing one or more measurements in accordance with receiving the first reference signal associated with the first beam and the second reference signal associated with the second beam to determine one or more parameters associated with one or both of the first reference signal or the second reference signal; and transmitting, to the first UE via the sidelink communication link, a signal indicating the one or more parameters, wherein communicating with the first UE using one of the first beam or the second beam is in accordance with transmitting the signal.

18. The method of claim 17, wherein the one or more parameters comprise one or more rank indicators, one or more channel quality indicators, one or more reference signal received powers, or any combination thereof, and wherein the signal comprises a medium access control control element signal.

19. A method for wireless communication at a second user equipment (UE), comprising:

receiving, from a first UE via a sidelink communication link as part of a beam management procedure, a first reference signal associated with a first beam over a first symbol of a sidelink slot, and a second reference signal associated with a second beam over a second symbol of the sidelink slot;

receiving, over one or more third symbols of the sidelink slot and associated with one or more of the first beam or the second beam, a gain control signal for a gain control operation, the gain control operation associated with a first set of one or more beams having a first beam width and a second set of one or more beams having a second beam width less than the first beam width, wherein the second set of one or more beams comprises one or both of the first beam or the second beam; and communicating with the first UE using one of the first beam or the second beam in accordance with receiving the first reference signal and the second reference signal as part of the beam management procedure.

20. The method of claim 19, wherein:

the gain control signal is associated with a third beam of the first set of one or more beams and received at a first power level higher than a second power level at which one or both of the first reference signal or the second reference signal are received; or the gain control signal is associated with the third beam of the first set of one or more beams and received at a third power level higher than a fourth power level at which one or more signals associated with a fourth beam of the first set of one or more beams are received; or the gain control signal is associated with a fifth beam of the second set of one or more beams and received at a fifth power level higher than a sixth power level at which one or more of the first reference signal or the second reference signal are received; or any combination thereof.

21. The method of claim 20, wherein receiving the gain control signal associated with the fifth beam of the second set of one or more beams is in accordance with a third power level satisfying a power level threshold, the third power level associated with the gain control signal and the third beam of the first set of one or more beams.

22. An apparatus for wireless communication at a first user equipment (UE), comprising:

at least one processor; and at least one memory coupled with the at least one processor, the at least one memory storing instructions executable by the at least one processor to cause the first UE to:

transmit, to a second UE via a sidelink communication link as part of a beam management procedure, a first reference signal using a first beam over a first symbol of a sidelink slot, and a second reference signal using a second beam over a second symbol of the sidelink slot, wherein the beam management procedure is associated with a first set of one or more beams having a first beam width and a second set of one or more beams having a second beam width less than the first beam width, the second set of one or more beams comprising the first beam, wherein the second set of one or more beams further comprises the second beam or the first set of one or more beams comprises the second beam; and communicate with the second UE using one of the first beam or the second beam in accordance with transmitting the first reference signal and the second reference signal as part of the beam management procedure.

23. The apparatus of claim 22, wherein the instructions are further executable by the at least one processor to cause the first UE to transmit, over one or more third symbols of the sidelink slot using one or more of the first beam or the second beam, a gain control signal for a gain control operation, the gain control operation associated with the first set of one or more beams having the first beam width and the second set of one or more beams having the second beam width less than the first beam width, wherein the second set of one or more beams comprises one or both of the first beam or the second beam.

24. An apparatus for wireless communication at a second user equipment (UE), comprising:

at least one processor; and at least one memory coupled with the at least one processor, the at least one memory storing instructions executable by the at least one processor to cause the second UE to:

receive, from a first UE via a sidelink communication link as part of a beam management procedure, a first reference signal associated with a first beam over a first symbol of a sidelink slot, and a second reference signal associated with a second beam over a second symbol of the sidelink slot, wherein the beam management procedure is associated with a first set of one or more beams having a first beam width and a second set of one or more beams having a second beam width less than the first beam width, the second set of one or more beams comprising the first beam, wherein the second set of one or more beams further comprises the second beam or the first set of one or more beams comprises the second beam;

perform one or more measurements in accordance with receiving the first reference signal associated with the first beam and the second reference signal associated with the second beam to determine one or more parameters associated with one or both of the first reference signal or the second reference signal;

transmit, to the first UE via the sidelink communication link, a signal indicating the one or more parameters; and communicate with the first UE using one of the first beam or the second beam in accordance with receiving the first reference signal and the second reference signal as part of the beam management procedure, wherein communicating with the first UE using one of the first beam or the second beam is in accordance with transmitting the signal.

* * * * *